(12) United States Patent
Reddy et al.

(10) Patent No.: US 12,733,041 B2
(45) Date of Patent: Sep. 8, 2026

(54) CLOUD-CENTRIC DESIGN FOR ULTRA-WIDEBAND (UWB) INFRASTRUCTURE-BASED POSITIONING

(71) Applicant: QUALCOMM Incorporated, San Diego, CA (US)

(72) Inventors: Varun Amar Reddy, San Diego, CA (US); Alexandros Manolakos, Athens (GR); Pooria Pakrooh, San Marcos, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 18/717,743

(22) PCT Filed: Feb. 28, 2023

(86) PCT No.: PCT/US2023/014120
§ 371 (c)(1),
(2) Date: Jun. 7, 2024

(87) PCT Pub. No.: WO2023/167858
PCT Pub. Date: Sep. 7, 2023

(65) Prior Publication Data

US 2025/0056627 A1 Feb. 13, 2025

(30) Foreign Application Priority Data

Mar. 3, 2022 (GR) .............................. 20220100198

(51) Int. Cl.
*H04W 74/0838* (2024.01)

(52) U.S. Cl.
CPC ............................... *H04W 74/0838* (2024.01)

(58) Field of Classification Search
CPC ......... H04W 74/0838; H04W 74/0808; H04W 64/00; H04W 4/70; H04W 4/02; G01S 5/02; G01S 7/006; G01S 13/765
See application file for complete search history.

(56) References Cited

U.S. PATENT DOCUMENTS

2010/0142496 A1* 6/2010 Lee ....................... H04W 72/51 370/468
2020/0154473 A1* 5/2020 Padaki ................ H04W 74/006
(Continued)

FOREIGN PATENT DOCUMENTS

CN 112913313 A 6/2021

OTHER PUBLICATIONS

European Search Report—EP25164098—Search Authority—Munich—Apr. 28, 2025.
(Continued)

*Primary Examiner* — Robert C Scheibel
(74) *Attorney, Agent, or Firm* — Thien T. Nguyen

(57) ABSTRACT

In some implementations, an ultra-wideband (UWB) management server may send a first message to a UWB anchor, wherein: the first message is indicative of a first threshold to use in a UWB positioning session, the first threshold specifying at least one trigger condition for making available one or more reserved time slots in a Contention Access Period (CAP) of the UWB positioning session. The UWB management server may determine a second threshold for identifying a UWB responder having a respective reserved time slot in the CAP. The UWB management server may send a second message to the UWB anchor, wherein the second message causes the UWB anchor to either: (i) move the respective reserved time slot in the CAP for the UWB responder to a respective one or more time slots in a
(Continued)

Contention Free Period (CFP), or (ii) terminate the UWB positioning session with the UWB responder.

37 Claims, 20 Drawing Sheets

(56) References Cited

U.S. PATENT DOCUMENTS

| | | | | |
|---|---|---|---|---|
| 2022/0066010 | A1 | 3/2022 | Henry et al. | |
| 2023/0141919 | A1* | 5/2023 | Jeon | G16Y 40/60 342/125 |
| 2023/0164736 | A1* | 5/2023 | Kim | H04L 5/0048 455/456.1 |

OTHER PUBLICATIONS

Bonafini F., et al., "Exploiting Time Synchronization as Side Effect in UWB Real-Time Localization Devices", IEEE International Symposium on Precision Clock Synchronization for Measurement, Control, and Communication (ISPCS), Sep. 30, 2018, pp. 1-6, XP033451150, DOI: 10.1109/ISPCS.2018.8543074, Abstract, pp. 1-3 Figure 3.

International Search Report and Written Opinion—PCT/US2023/014120—ISA/EPO—Aug. 28, 2023.

Lan/Man Standards Committee of the IEEE Computer: "Amendment: Enhanced Ultra Wide-Band (UWB) Physical Layers (PHYs) and Associated Ranging Techniques", P802.15.4Z-D4, IEEE-SA, Piscataway, NJ USA, vol. 802.15 EIR drafts, 802.15.4z drafts, No. D4, Oct. 26, 2019, pp. 1-181, XP068155563, paragraph [6.9.7.1] paragraph [7.4.4.41].

Overman J., "Wireless Clock Synchronisation for UWB Positioning", Mathematics and Computer Science, Delft University of Technology, Aug. 25, 2019, 74 Pages, XP055942018, Paragraphs [03.1], [3.2.1]-[3.2.4] paragraph [05.3].

Partial International Search Report—PCT/US2023/014120—ISA/EPO—Jun. 2, 2023.

* cited by examiner

CLOUD-CENTRIC DESIGN FOR ULTRA-WIDEBAND (UWB) INFRASTRUCTURE-BASED POSITIONING

RELATED APPLICATIONS

This application is a National Phase entry of International Application No. PCT/US2023/014120, filed Feb. 28, 2023, entitled "CLOUD-CENTRIC DESIGN FOR ULTRA-WIDEBAND (UWB) INFRASTRUCTURE-BASED POSITIONING" which claims the benefit of Greek application No. 20220100198, filed Mar. 3, 2022, entitled "CLOUD-CENTRIC DESIGN FOR UWB INFRASTRUCTURE-BASED POSITIONING," both of which are assigned to the assignee hereof, and incorporated herein in their entirety by reference.

BACKGROUND

1. Field of Disclosure

The present disclosure generally relates to the radiofrequency (RF)-based position determination (or positioning) of an electronic wireless device. More specifically, the present disclosure relates to ultra-wideband (UWB)-based positioning.

2. Description of Related Art

UWB-based positioning offers a highly accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. One or more UWB positioning sessions (or simply "UWB sessions") may be conducted to perform the UWB-based positioning, and a given UWB device may have an opportunity to participate in several UWB sessions.

BRIEF SUMMARY

An example method of ultra-wideband (UWB) anchor configuration by a UWB management server, according to this disclosure, may comprise sending a first control message from the UWB management server to a first UWB anchor device, wherein the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning. The method also may comprise determining a second threshold for identifying one or more UWB responder devices having respective one or more reserved time slots in the CAP. The method also may comprise sending a second control message from the UWB management server to the first UWB anchor device, wherein the second control message causes the first UWB anchor device to either: (i) move the respective one or more reserved time slots in the CAP for the one or more UWB responder devices to a respective one or more time slots in a Contention Free Period (CFP) of the UWB positioning session, or (ii) terminate the UWB positioning session with the one or more UWB responder devices.

An example method of ultra-wideband (UWB) anchor configuration, according to this disclosure, may comprise receiving, at a first UWB anchor device, a first control message from a UWB management server, wherein the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning. The method also may comprise receiving, at the first UWB anchor device, a second control message from the UWB management server. The method also may comprise responsive to receiving the second control message, either: (i) moving respective one or more reserved time slots in the CAP for one or more UWB responder devices to a respective one or more time slots in a contention free period (CFP) of the UWB positioning session, or (ii) terminating the UWB positioning session with the one or more UWB responder devices. The method also may comprise wherein the one or more UWB responder devices are identified using a second threshold.

An example method of ultra-wideband (UWB) anchor configuration by a UWB management server, according to this disclosure, may comprise receiving, at the UWB management server, Responder Management List (RML) information indicative of a respective RML of each UWB anchor device of a plurality of UWB anchor devices. The method also may comprise determining, with the UWB management server, a configuration for a plurality of concurrent UWB positioning sessions of at least one UWB anchor device of the plurality of UWB anchor devices, wherein: the configuration is based at least in part on the RML information, and the configuration includes one or more parameters for transmissions by one or more UWB responder devices during the plurality of concurrent UWB positioning sessions. The method also may comprise sending a control message from the UWB management server to the at least one UWB anchor device indicative of the configuration.

An example method of ultra-wideband (UWB) anchor configuration, according to this disclosure, may comprise sending, from a first UWB anchor device to a UWB management server, Responder Management List (RML) information indicative of a RML of the first UWB anchor device. The method also may comprise receiving, at the first UWB anchor device, a control message from the UWB management server, the control message indicative of a configuration for a UWB positioning session, wherein: the configuration is based at least in part on the RML information, and the configuration includes one or more parameters for transmissions by one or more UWB responder devices during the UWB positioning sessions. The method also may comprise sending a message to the one or more UWB responder devices indicative of the configuration.

An example ultra-wideband (UWB) management server, according to this disclosure, may comprise: a transceiver, a memory, one or more processors communicatively coupled with the transceiver and the memory, wherein the one or more processors are configured to send a first control message via the transceiver to a first UWB anchor device, wherein: the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning. The one or more processors further may be configured to determine a second threshold for identifying one or more UWB responder devices having respective one or more reserved time slots in the CAP. The one or more processors further may be configured to send a second control message via the transceiver to the first UWB anchor device, wherein the second control message is configured to cause the first UWB anchor device to either: (i) move the respective one or more reserved time slots in the CAP for the one or more UWB responder devices to a respective one or more time slots in a Contention Free Period (CFP) of the UWB positioning session, or (ii) terminate the UWB positioning session with the one or more UWB responder devices.

An example first ultra-wideband (UWB) anchor device, according to this disclosure, may comprise a transceiver, a memory, one or more processors communicatively coupled with the transceiver and the memory, wherein the one or more processors are configured to receive, via the transceiver, a first control message from a UWB management server, wherein: the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning. The one or more processors further may be configured to receive, via the transceiver, a second control message from the UWB management server. The one or more processors further may be configured to responsive to receiving the second control message, either: (i) moving respective one or more reserved time slots in the CAP for one or more UWB responder devices to a respective one or more time slots in a contention free period (CFP) of the UWB positioning session, or (ii) terminating the UWB positioning session with the one or more UWB responder devices. The one or more processors further may be configured to wherein the one or more UWB responder devices are identified using a second threshold.

An example ultra-wideband (UWB) management server, according to this disclosure, may comprise a transceiver, a memory, one or more processors communicatively coupled with the transceiver and the memory, wherein the one or more processors are configured to receive, via the transceiver, Responder Management List (RML) information indicative of a respective RML of each UWB anchor device of a plurality of UWB anchor devices. The one or more processors further may be configured to determine a configuration for a plurality of concurrent UWB positioning sessions of at least one UWB anchor device of the plurality of UWB anchor devices, wherein: the configuration is based at least in part on the RML information, and the configuration includes one or more parameters for transmissions by one or more UWB responder devices during the plurality of concurrent UWB positioning sessions. The one or more processors further may be configured to send a control message indicative of the configuration via the transceiver to the at least one UWB anchor device.

An example first ultra-wideband (UWB) anchor device, according to this disclosure, may comprise a transceiver, a memory, one or more processors communicatively coupled with the transceiver and the memory, wherein the one or more processors are configured to send, via the transceiver to a UWB management server, Responder Management List (RML) information indicative of a RML of the first UWB anchor device. The one or more processors further may be configured to receive, via the transceiver, a control message from the UWB management server, the control message indicative of a configuration for a UWB positioning session, wherein: the configuration is based at least in part on the RML information, and the configuration includes one or more parameters for transmissions by one or more UWB responder devices during the UWB positioning sessions. The one or more processors further may be configured to send a message indicative of the configuration to the one or more UWB responder devices.

This summary is neither intended to identify key or essential features of the claimed subject matter nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The appended drawings are provided to complement the following description. It can be noted that the term "background" is included in the text of many of the appended drawings to provide context for the embodiments described herein. It does not necessarily follow, however, that such information should be considered prior art. Some information identified as background in the appended drawings may comprise novel features used by one or more embodiments described herein.

Figure 1:
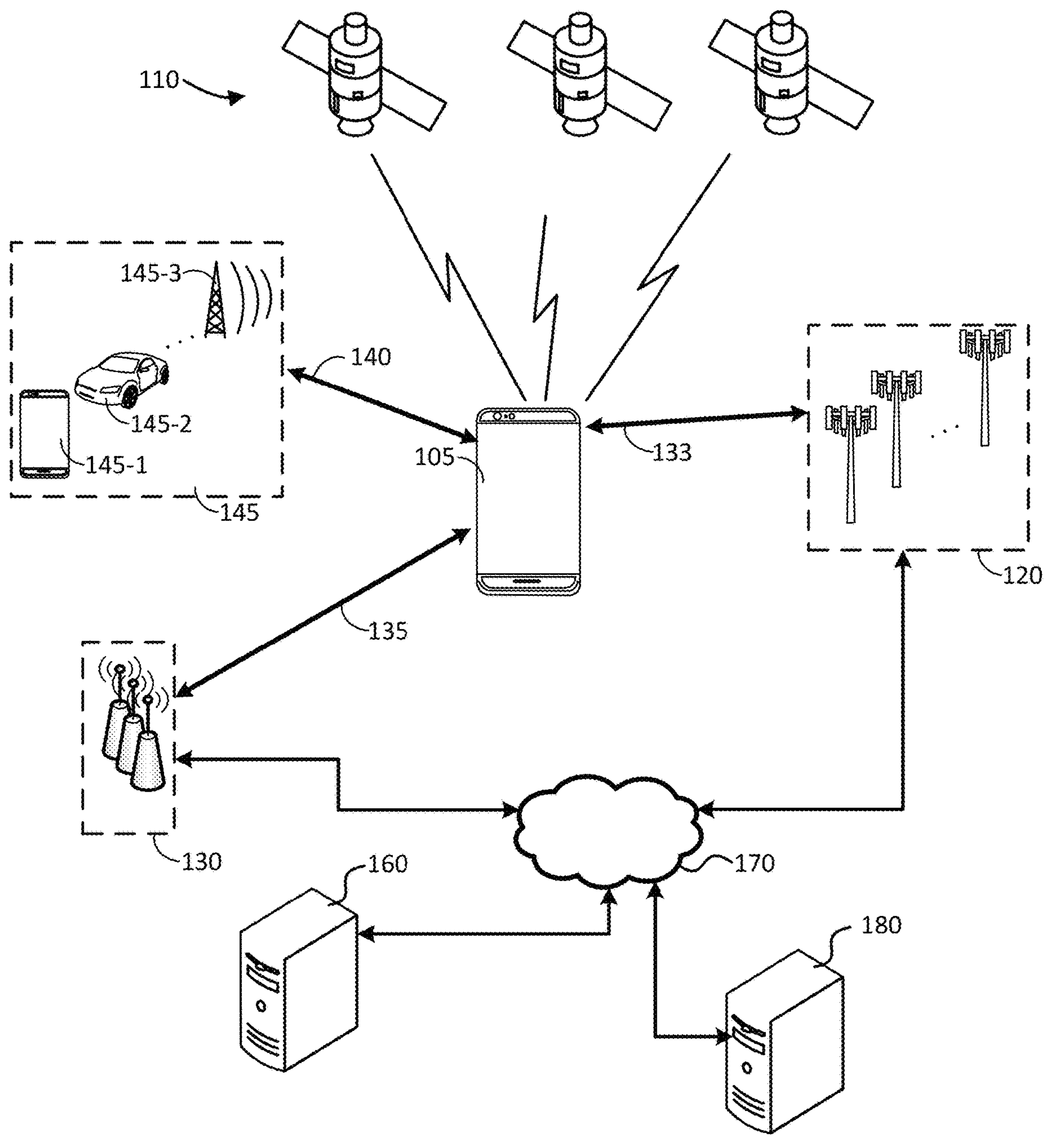
FIG. 1 is a simplified illustration of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "positioning reference signals," "reference signals for positioning," and the like may be used to refer to signals used for positioning of a mobile device, such as a UWB device. As described in more detail herein, such signals may comprise any of a variety of signal types. Additionally, unless otherwise specified, references to "sensing reference signals," "reference signals for sensing," and the like may be used to refer to signals used for RF sensing (also generically referred to herein as "sensing") as described herein. A signal used for RF sensing and/or positioning may be generally referred to herein as a reference signal (RS). As described in more detail herein, such signals may comprise any of a variety of signal types but may not necessarily be limited to signals solely used for RF sensing.

Further, unless otherwise specified, the term "positioning," "position determination," "location determination," "location estimation," and the like, as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

As previously noted, UWB-based positioning offers a highly accurate, low-power positioning solution relative to other RF-based positioning techniques for wireless electronic devices. UWB-based positioning can be used in industrial applications, such as by robots and/or other Internet of Things (IoT) devices in a factory setting, indoor positioning of consumer electronics, and more. One or more UWB positioning sessions (or simply "UWB sessions") may be conducted to perform the UWB-based positioning, and a given UWB device may have an opportunity to participate in several UWB sessions. UWB sessions may be set up by a UWB controller device and one or more UWB responder devices, or controlees, and may include a contention access period (CAP), a contention-free period (CFP), or a "hybrid" of both (also described herein as "hybrid-based ranging"). Because UWB controller devices may be unaware of nearby UWB sessions conducted between other UWB devices, and therefore a network of UWB devices the subject to RF interference and overall inefficiencies. The address these and other issues, embodiments herein provide techniques by which a server (also referred to herein as a connected intelligent edge (CIE) or UWB management server) and obtain session information from various UWB controller devices and provide configuration information to the various UWB controller devices to help achieve efficiencies and reduce RF interference across multiple UWB sessions.

Various aspects of this disclosure relate generally to UWB positioning or ranging. Some aspects more specifically relate to UWB session configuration in UWB positioning. In some examples, a server may define one or more thresholds related to UWB sessions for one or more UWB controller devices, and the one or more UWB controller devices can report to the server if the one or thresholds have been exceeded. If so, the server can configure the one or more UWB controller devices with action to take, such as moving one or more responder devices from a CAP to a CFP. In doing so, the server may utilize responder management list (RML) information received from the one or more controller devices. According to some embodiments, the server configuration may further be based on device capability information of the one or more controller devices. According to some embodiments, UWB controller devices may be configured to take action when a threshold has been exceeded without reporting it to the server.

Particular aspects of the subject matter described in this disclosure can be implemented to realize one or more of the following potential advantages. In some examples, by providing for server-based UWB session configuration, the described techniques can be used to make more efficient use of bandwidth and power usage among devices participating in a UWB positioning session. Moreover, by using a server to perform the configuration of also pull UWB controller devices, these advantages can be realized among a larger set of UWB devices. These and other advantages will be apparent to a person of ordinary skill in the art in view of the embodiments described herein. Embodiments are described below, following a review of applicable technology.

Although UWB-based positioning may be used in an ad hoc manner as a standalone positioning technique between electronic devices capable of UWB positioning (also referred to herein as "UWB devices"), in some embodiments UWB-based positioning may be used as one of many techniques for positioning an electronic device in a positioning system. FIG. 1 provides an example of such a positioning system.

FIG. 1 is a simplified illustration of a positioning system 100 in which a mobile device 105, location server 160, and/or other components of the positioning system 100 can use the techniques provided herein for time alignment configuration for hybrid 5G and UWB positioning of mobile device 105, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed hereafter.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include an LTE wireless network, a Fifth Generation (5G) wireless network (also referred to as an NR wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. In a wireless cellular network (e.g., LTE or 5G), the mobile device 105 may be referred to as a user equipment (UE)

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a GNSS such as GPS, GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120 and may be coordinated by a location server 160. In some embodiments, satellites 110 used for NTN-based positioning may be different than those used for GNSS-based positioning.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), UWB, IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 are used in the position determination of a particular mobile device 105, the mobile device 105 for which the position is to be determined may be referred to as the "target mobile device," and each of the other mobile devices 145 used may be referred to as an "anchor mobile device." (In a cellular/mobile broadband network, the terms "anchor UE" and "target UE" may be used.) For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g. latitude, longitude, and optionally altitude), relative (e.g. relative to some known absolute location), or local (e.g. X, Y, and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building, etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as a friend or relative finder, or child or pet location). Additionally or alternatively, the external client 180 may obtain and provide the location of mobile device 105 to an emergency services provider, government agency, etc.

Figure 2A:
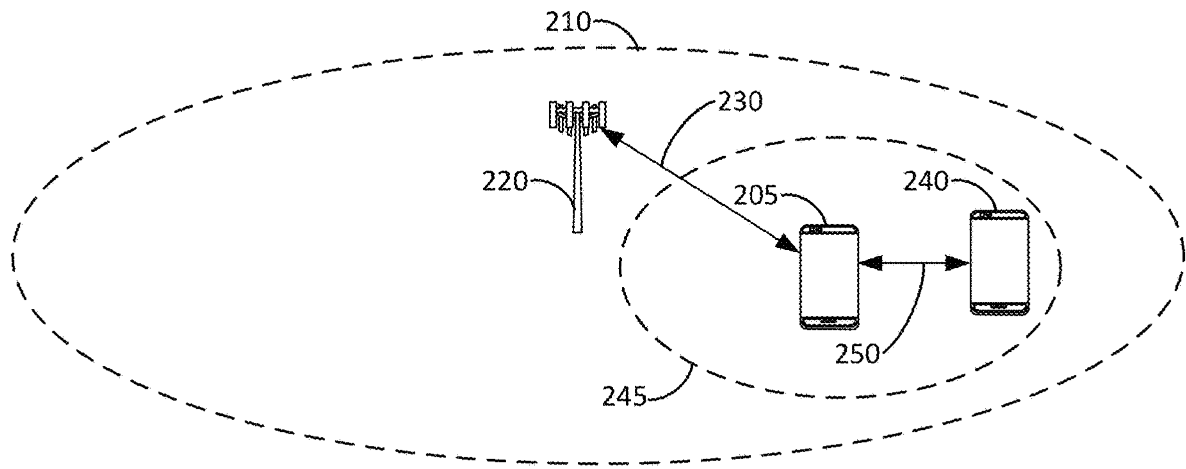
FIGS. 2A and 2B are diagrams illustrating how both ultra-wideband (UWB) and Fifth Generation (5G) New Radio (NR) may be used for positioning a target device, according to some embodiments.

FIG. 2A is a diagram illustrating a scenario in which both UWB and cellular (5G NR) technologies may be used for positioning a target device 205. Here, target device 205 may correspond with mobile device 105 of FIG. 1. Generally put, according to some embodiments, the hybrid cellular/UWB positioning (or simply "cellular/UWB positioning") of a device may utilize both cellular and UWB positioning technologies to determine the location of a device that is capable of taking positioning-related measurements in both cellular and UWB technologies. The use of both cellular and UWB technologies may utilize additional anchors (cellular and/or UWB anchors) for positioning measurements, which can allow for the positioning of a device in situations where the use of a single technology would not, and/or increased accuracy over the use of a single technology. Hybrid cellular/UWB positioning (not to be confused with hybrid UWB positioning/hybrid-based ranging described below) also may be referred to as "5G/UWB" or "NR/UWB" positioning where cellular technology comprises 5G NR.

In this scenario, a target device 205 may comprise a UE of the cellular network within a coverage region 210 of a base station 220, which may comprise a serving base station of the target device 205. Communication between the base station 220 and target device 205 may occur across a network (Uu) interface 230, which may also be used to communicate DL and/or UL reference signals for cellular aspects of cellular/UWB positioning. According to some embodiments, the positioning of the target device 205 may be coordinated by the network via a location server (not shown), and related configuration data and/or assistance data may be related to the target device 205 by the base station 220 via the network interface 230.

The UWB aspects of cellular/UWB positioning, the target device 205 may send and/or receive UWB RF signals from UWB device 240, acting as a UWB anchor. The UWB RF signals may be coordinated using an out-of-band (OOB) interface 250, which may utilize Bluetooth, Wi-Fi, or similar wireless technology, for example, which may have a corresponding wireless coverage region 245. According to some embodiments, the UWB aspects of cellular/UWB positioning may be coordinated by the target device 205 and/or UWB device 240, or maybe coordinated by location or other server (not shown). In some embodiments, configuration data and/or assistance data may be provided to a target device 205 and/or UWB device 240 directly by the base station 220. In some embodiments, configuration data and/or assistance data may be provided to a target device 205 directly by the base station 220 (e.g., via the network interface 230), and the target device 205 may relay the configuration data and/or assistance data to the UWB device 240 (e.g., via the OOB interface 250.

It can be noted that, although a single base station 220 and a single UWB device 240 are illustrated in FIG. 2, scenarios in which cellular/UWB positioning of a target device 205 may include one or more base stations and one or more UWB devices.

Figure 2B:
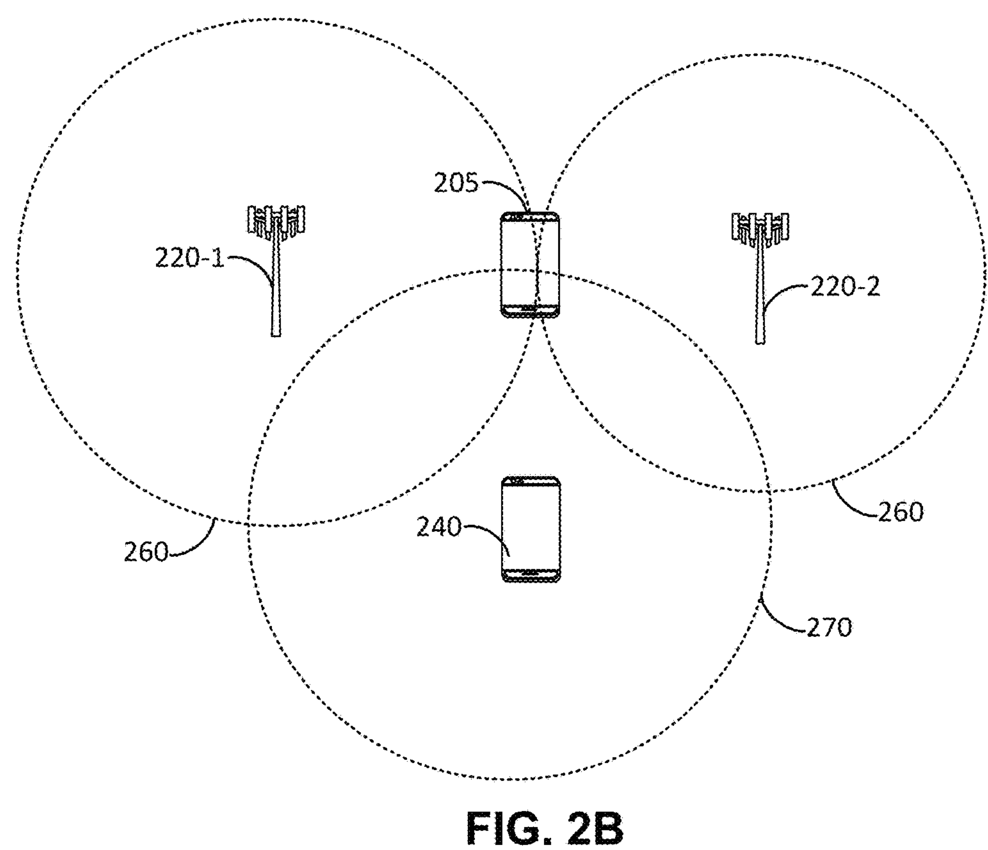

FIG. 2B is a simplified diagram illustrating how the positioning of the target device 205 may be performed, according to some embodiments. Here, measurements using cellular technology may comprise round trip signal propagation delay (RTT) measurements performed between the target device 205 and each of a first base station 220-1 and a second base station 220-2 to determine a distance between the target device 205 and the base stations 220. (These distances are represented by circles 260.) Additionally, as indicated, measurements and UWB may comprise RTT measurements (also referred to as two-way ranging (TWR) in UWB) performed to determine a distance between the target device 205 and one or more UWB anchors, such as UWB device 240. (The distance between the target device 205 and the UWB device 240 is represented by circles 270.) Using multilateration, the location of the target device 205 may be determined as location in which circles representing the distances (circles 260 and 270) intersect. Because the distances may have some uncertainty, the resulting location of the target device 205 also may have some uncertainty.

UWB-based positioning, including cellular/UWB positioning as described herein, may be used in a variety of applications. This may include access control (ranging-based services), such as residential and enterprise access control, parking garage access, vehicle digital car key applications (e.g., specified by Car Connectivity Consortium® (CCC) standard), smart transportation and/or smart retail (unmanned store access), industry, healthcare, or the like. Some applications may include location/position-based services, such as emergency services/disaster management, vehicular traffic management (e.g., vehicular positioning, bike sharing), transportation (e.g., ride-sharing, reserved seat validation), augmented reality/virtual reality (AR/VR) gaming/multimedia, smart retail (e.g., indoor navigation, foot traffic analytics), healthcare (e.g., asset and patient tracking/monitoring), or the like. Some applications may Device-to-Device (D2D) data-based applications such as conference call systems, drone coordination, data applications such as ticket validation, payment validation, patient data sharing in healthcare, AR/VR gaming/multimedia, or the like.

Figure 3A:
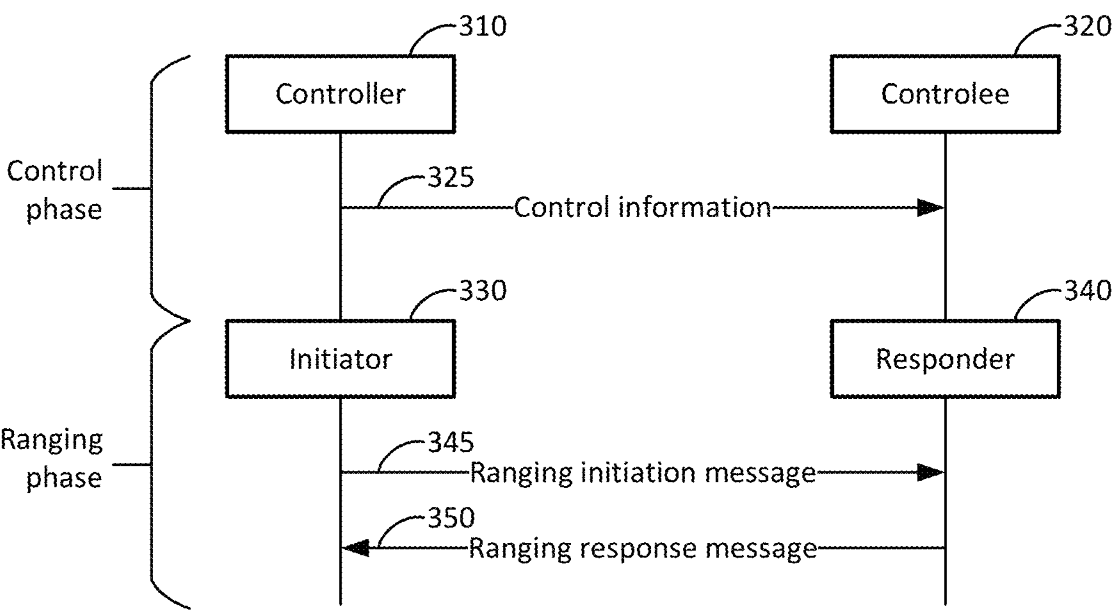
FIGS. 3A and 3B are flow diagrams illustrating how UWB sessions may be coordinated and conducted, according to some embodiments.

FIG. 3A is a flow diagram illustrating the roles different devices may assume with regard to a UWB ranging session (or simply a "UWB session"). Here, each UWB device may be referred to as an enhanced ranging device (ERDEV). ERDEVs may be referred to by different terminologies (e.g. initiator/responder or controller/controlee) at different layers of the network stack. The terms initiator and responder (described hereafter) would be used at lower layers (e.g., at UWB physical (PHY) and media access control (MAC) layers), while the terms controller and controlee (also described hereafter) may be used at higher layers (e.g., an application layer of the ERDEVs). Here, either ERDEV may correspond with a target device 205 or UWB device 240 of FIG. 2, or mobile device 105 of FIG. 1.

As indicated, for a pair of ERDEVs communicating with each other, the controller 310 is an ERDEV that sends control information 325 to a receiving ERDEV, designated as the controlee 320. The control information 325 may include parameters for the UWB ranging session, such as timing, channel, etc. Although not illustrated, the controlee 320 can send an acknowledgment to the control information 325, may negotiate changes to the parameters, and/or the like.

The exchange between controller 310 and controlee 320, including the sending of the control information 325 and subsequent related exchanges between controller 310 and controlee 320 regarding control information, may be conducted out of band (OOB) using different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 310 and controlee 320 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round. Accordingly, some aspects of the control phase may be considered to occur in band, subsequent to the preliminary OOB exchange between the controller 310 and controlee 320.)

The UWB session may occur afterward, in accordance with the parameters provided in the control information. In the ranging phase of the UWB session, one ERDEV may take the role of an initiator 330 and the other ERDEV may take the role of a responder 340. As indicated in FIG. 3A, the initiator 330 may initiate UWB ranging by sending a ranging initiation message 345 to the responder 340, to which the responder 340 may reply with a ranging response message 350, and timing measurements may be made of these messages (by the devices receiving the messages) to perform two-way ranging (TWR). Depending on the parameters of the control information 325, additional exchanges may be made in the ranging phase between the initiator 330 and responder 340 to allow for additional ranging measurements.

Figure 3B:
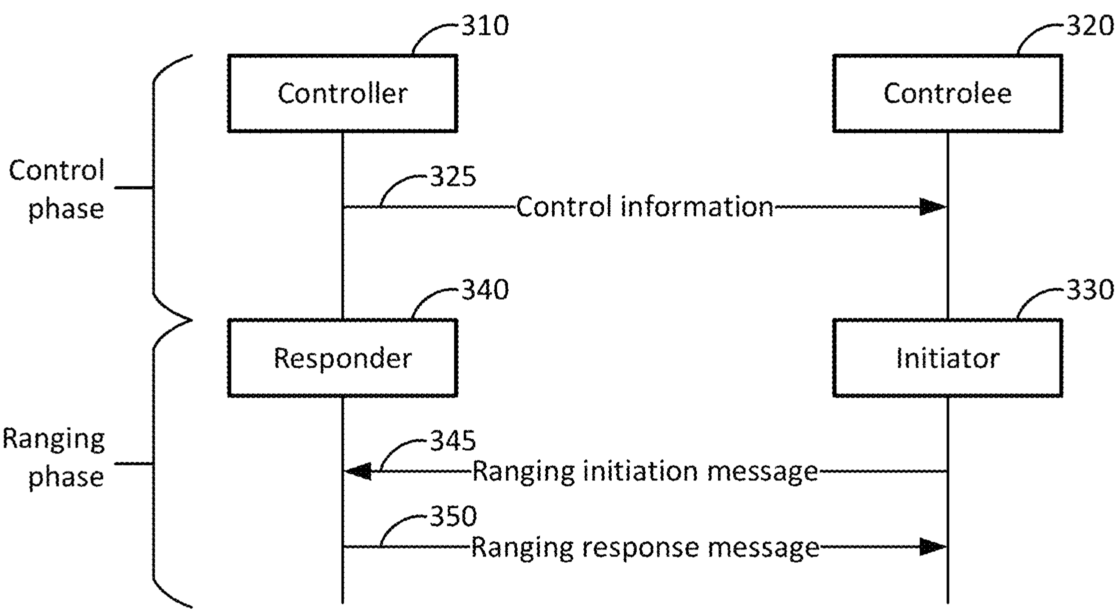

The roles of initiator 330 and responder 340 may be indicated in the control information 325. Further, as indicated in FIG. 3A, the controller 310 in the control phase may be the initiator 330 in the ranging phase of the UWB session. Alternatively, as indicated in FIG. 3B, the controller 310 in the control phase may be the responder 340 in the ranging phase. The determination of which device is initiator 330 and which is responder 340 may depend on the parameters set forth in the control information 325, in which case the controlee 320 correspondingly becomes either the responder 340 or the initiator 330. According to some embodiments, a controller/initiator may conduct ranging with multiple controlees/responders.

Embodiments herein may help ensure UWB measurements and cellular measurements cellular/UWB positioning are aligned in the time domain to accurately reflect the position (e.g., at a given time) of a target UE. To do this, embodiments provide for the coordination of measurements between cellular reference signals and UWB positioning sessions. FIG. 4 illustrates how this coordination may be performed, according to some embodiments.

Figure 4A:
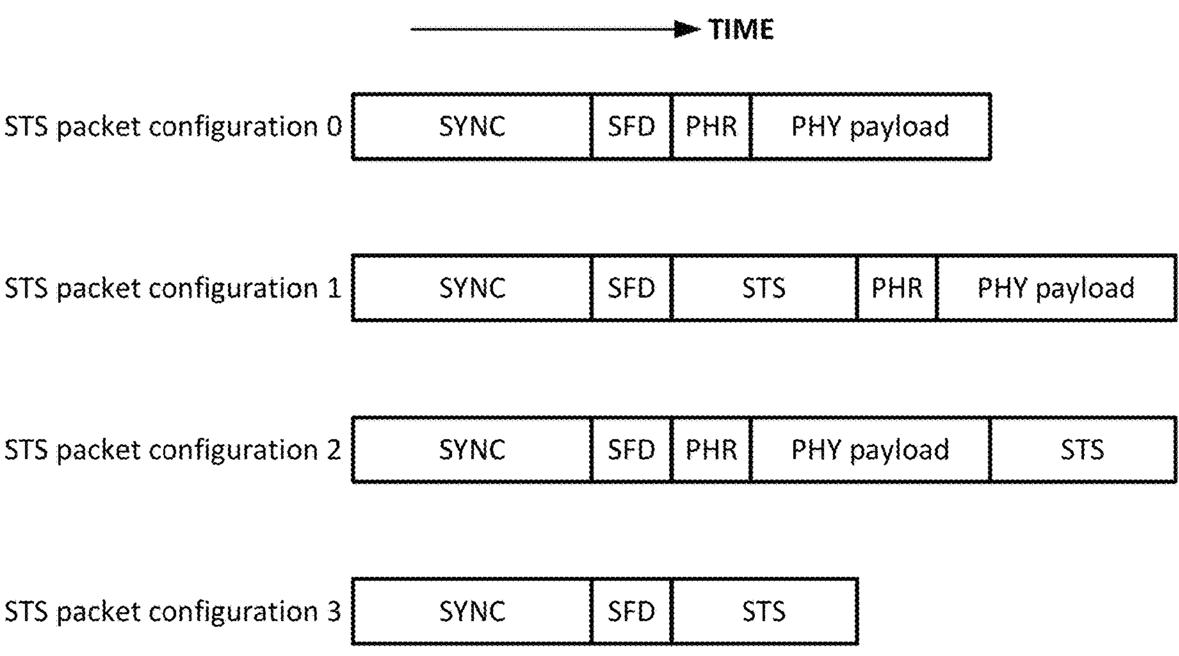
FIG. 4A is an illustration of different packet configurations that can be used in a UWB session at the UWB physical (PHY) layer.

FIG. 4A is an illustration of different packet configurations that can be used in a UWB session (e.g., for sensing and/or positioning) at the UWB PHY layer, which may be used in some embodiments (e.g., in ranging initiation and/or response messages, as shown in FIGS. 3A and 3B above). These packet configurations may be defined and/or used in relevant UWB standards (e.g., IEEE 802.15.4z). As shown, ranging functionality may be based on channel estimation using the SYNC preamble, included in each of the four possible configurations (e.g., configurations 0-3) used in current configurations. (Configuration 0 is currently used as a default configuration.) The SYNC preamble may comprise a bit sequence (such as a Ipatov ternary sequence, Gold sequence, Golay sequence, polyphase sequence like Zadoff-Chu sequence, etc.) that exhibits good autocorrelation properties (e.g., sufficient for ranging/sensing measurements). As illustrated, the different packet configurations may also include a start of frame delimiter (SFD) to help demarcated the SYNC preamble from the rest of the packet, a PHY payload for conveying data (e.g., for communication, time-stamp information, etc.), and/or a scrambled timestamp sequence (STS). The STS is a security feature with a unique sequence known to the transmitter and receiver, which can authenticate the data packet source and help prevent over-the-air attacks that can falsify a ToA estimate for ranging/sensing in a UWB session. This aspect of UWB ranging/sensing is described in more detail with regard to FIG. 4B.

Figure 4B:
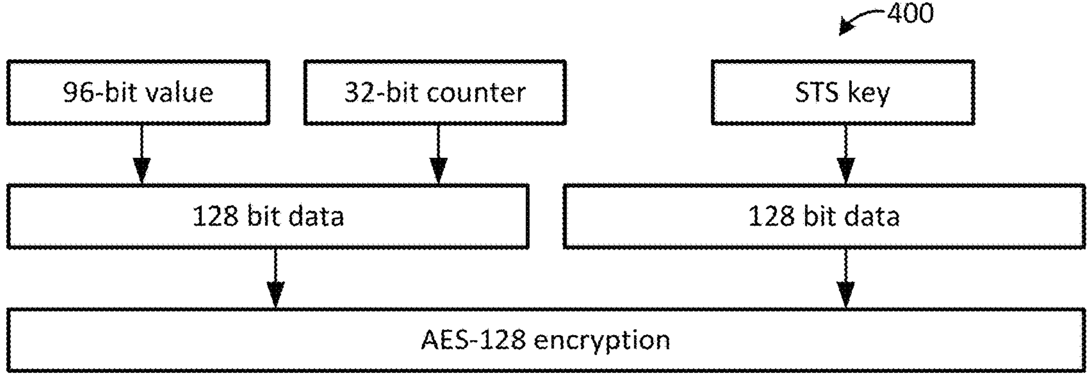
FIG. 4B is an illustration of a deterministic random bit generator that can be used to generate a scrambled timestamp sequence (STS), which may be used in some embodiments.

FIG. 4B is an illustration of a deterministic random bit generator (DRBG) 400 that can be used to generate an STS, which may be used in some embodiments (e.g., to generate the STS as shown in FIG. 4A). Here, the DRBG 400 is based on Advanced Encryption Standard (AES)-128 in counter mode. As illustrated, the DRBG 400 uses a 96-bit value, a 32-bit counter, and an STS key. The STS key may be exchanged securely between ERDEVs (e.g., an initiator and one or more responders) prior to the UWB session. For example, an STS key may be provided by the controller (e.g., controller 310 of FIG. 3A or 3B), for example, at the application layer over a secure link (e.g., an OOB link). DRBG bits {0, 1} may be mapped to {+1, −1} and spread. This can result in a ternary sequence of {−1, 0, +1} chips. The ternary sequences may then be grouped (e.g., group of 32) to form an active STS segment.

Figure 5:
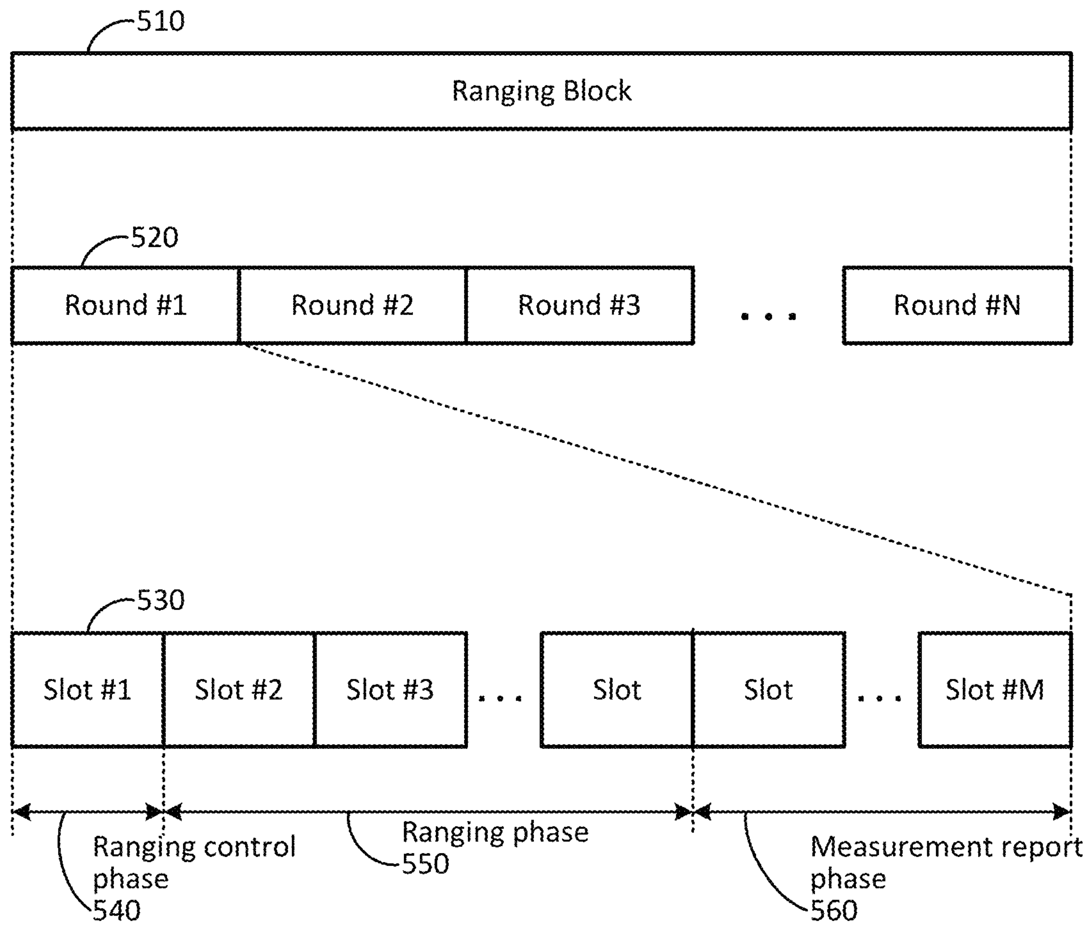
FIG. 5 is a diagram illustrating how time may be segmented and utilized within a UWB positioning session, which may be used in some embodiments.
Figure 5:
Figure 5:

FIG. 5 is a diagram 500 illustrating how time may be segmented and utilized within a UWB positioning session, which may be used in some embodiments. A UWB session may occur over a period of time divided into sub-portions according to a hierarchical structure. This timing comprises one or more consecutive ranging blocks 510, which may have a configurable duration (e.g., 200 ms). (For simplicity, only one ranging block 510 is shown in FIG. 5. However, a UWB session may utilize multiple blocks, which may occur in succession. Also, although called "ranging" blocks 510, they may be used for ranging and/or sensing.) Each ranging block 510 may be split into one or more successive rounds 520 (e.g., N rounds). The number and length of the rounds may be configurable. The rounds 520 may be further split into different slots 530, which also may have a configurable number and length (e.g., 1-2 ms). According to some embodiments, multiple rounds may be used for interference handling. For example, a given responder may transmit a message within only a single round per block, and the round index may either be statistically configured by the controller or selected per a hopping pattern.

The slots within a round 520 may be allocated for different purposes. For example, the initial slot may be dedicated as the ranging control phase 540, in which an initiator UWB device (e.g., an initiator anchor), transmits control information for the other UWB devices participating in a UWB session (e.g., responder anchors and/or other UWB devices). This information can include, for example, an allocation of slots among the different responder devices. During the subsequent ranging phase 550, the different responder may transmit in accordance with the allocated slot. That is, each responder may be allocated a corresponding slot in the ranging phase 550 to transmit one or more ranging/sensing signals, which may be used to perform SS-TWR or DS-TWR, for example. The ranging phase 550 may be followed by a measurement report phase 560 in which UWB anchors in a cluster may report measurements (e.g., of signals measured during the ranging phase 550). The structure of the initiation and/or response messages may use the PHY format previously described with respect to FIG. 4A. Multiple UWB sessions can be time multiplexed to prevent interference with one another.

Figure 6A:
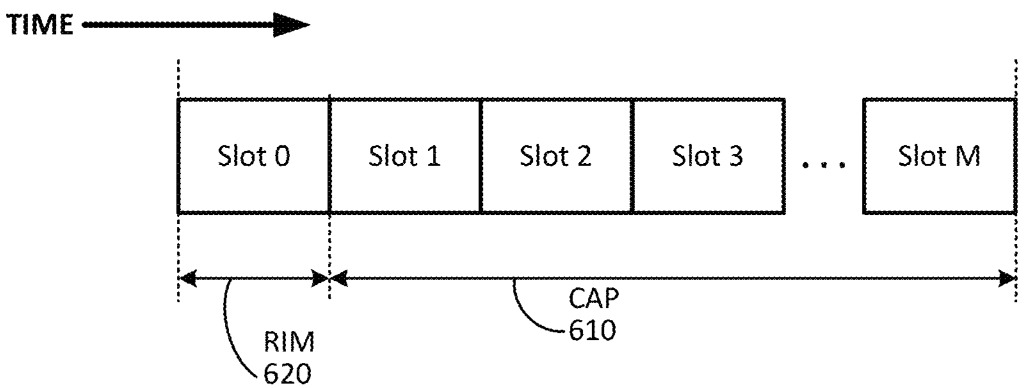
FIGS. 6A and 6B are timing diagrams illustrating how contention-based ranging using a Contention Access Period (CAP) 610 may be implemented, according to some embodiments.
Figure 6B:
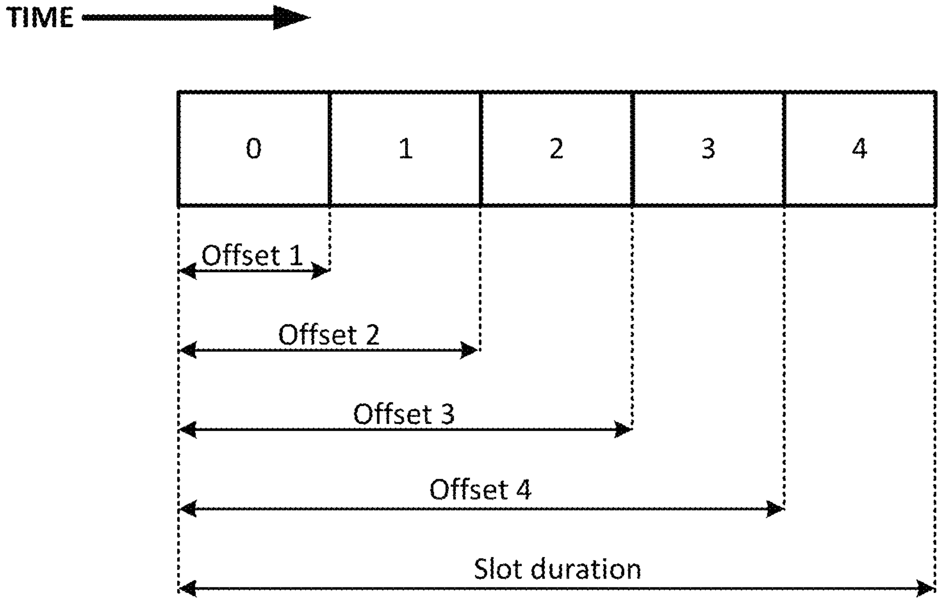

FIGS. 6A and 6B are timing diagrams illustrating how contention-based ranging using a Contention Access Period (CAP) 610 may be implemented, according to some embodiments. The CAP 610 may be preceded by a ranging initiation message (RIM) 620 (e.g., sent by the initiator). Contention-based ranging may be used, for example, when the controller does not know about the devices that will participate in the UWB Session. In such instances, the controller may always assume the role of the initiator and the controlees (e.g., one or more responding devices that will participate in the session) may always assume the role of the responders. To allow multiple controlee/responders to participate in the UWB session, the controller may advertise a CAP 610, which comprises a portion of slots within the ranging round. (Contents of the message advertising the CAP 610 may include parameters that may be chosen by the controller/initiator.) Essentially, the CAP 610 indicates slots within the round in which a controlee/responder may communicate to participate in the UWB session.

Devices that receive the message advertising the CAP 610 (e.g., potential controlees/responders) may respond based on, for example, rules implemented by the devices for participating in such ranging sessions. In particular, any controlee/responder that wants to participate in the UWB session a randomly select a slot of the CAP (e.g., which may be designated as slots 1 to M in each round, as indicated in FIG. 6A) and transmit a ranging message during the selected slot. Thus, the fewer controlee/responder responses and/or the larger the value for M, the less likely collisions are to occur.

According to some embodiments, each controlee/responder may also transmit after a random time offset within a slot. FIG. 6B illustrates example offsets for a slot. The allowable values for such a time offset are also contained within the control message. Once the controller has determined the identity of devices (e.g., using a responder management list (RML)) after a contention-based round, it can reserve some of the slots for those devices that were able to send a message in the preceding round. The remaining slots in the CAP 610 (up to M) may continue to serve as slots that can be randomly selected by other unknown devices. Thus, for a controlee/responder, access to the UWB session may be random access until the controlee/responder is recognized by the controller/initiator and included on the RML, after which the controlee/responder is given a dedicated slot for communication.

Figure 7A:
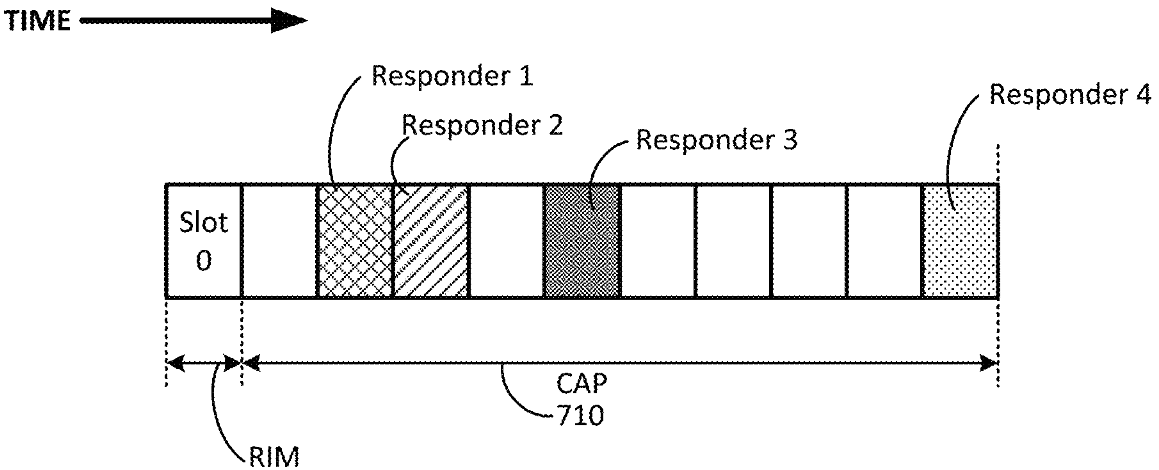
FIGS. 7A and 7B are timing diagrams illustrating how a responder management list (RML) may be used, according to an embodiment.
Figure 7B:
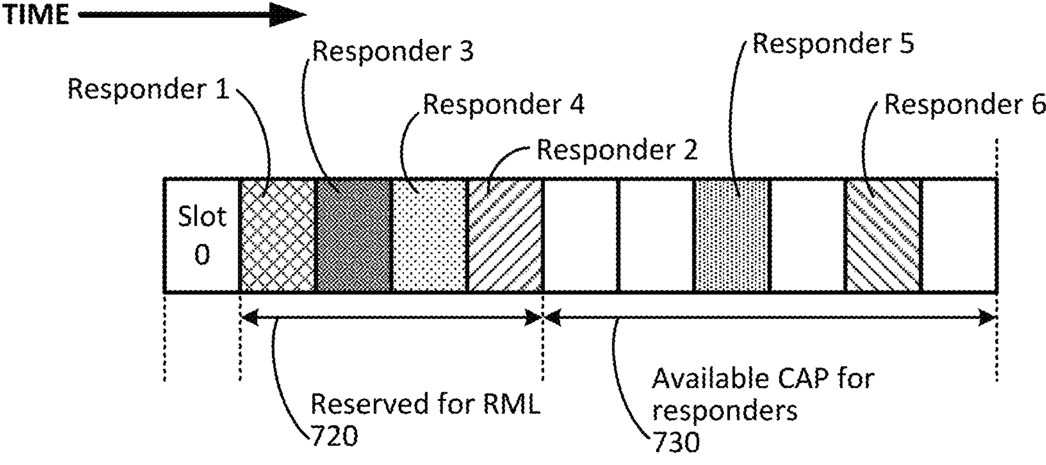

FIGS. 7A and 7B are timing diagrams illustrating how RML may be used, according to an embodiment. Here, FIG. 7A shows slots of a first round (or CAP portion of a round) and FIG. 7B shows slots of a subsequent round. The round in FIG. 7B may immediately follow the round in FIG. 7A (e.g., FIG. 7A shows round i, and FIG. 7B shows round i+1), but that may not necessarily be the case. (E.g., there may be one or more intervening rounds.) Once the controller has learned the identity of UWB devices (Responders 1-4) after the CAP 710 round of FIG. 7A, it can split the CAP of the subsequent round into a reserved portion 720 for the identified UWB devices, and the remaining slots 730 in the CAP are available for additional responding UWB devices (e.g., Responders 5 and 6). Generally put, the controller may add responding devices to the RML, and may further reserve a portion of a CAP in a subsequent round for devices on the RML. As the number of devices on the RML increases, the number of remaining available slots in the CAP may decrease.

According to some embodiments, "hybrid-based ranging" (not to be confused with hybrid cellular/UWB positioning) may be utilized in UWB, in which rounds include a combination of scheduled and unscheduled slots, in an extension of the concepts described above regarding FIGS. 7A and 7B. In hybrid-based ranging, a round may comprise at least one CAP and at least one contention-free period (CFP) to accommodate both known controlees (e.g., responding UWB devices) and unknown controlees.

Figure 8:
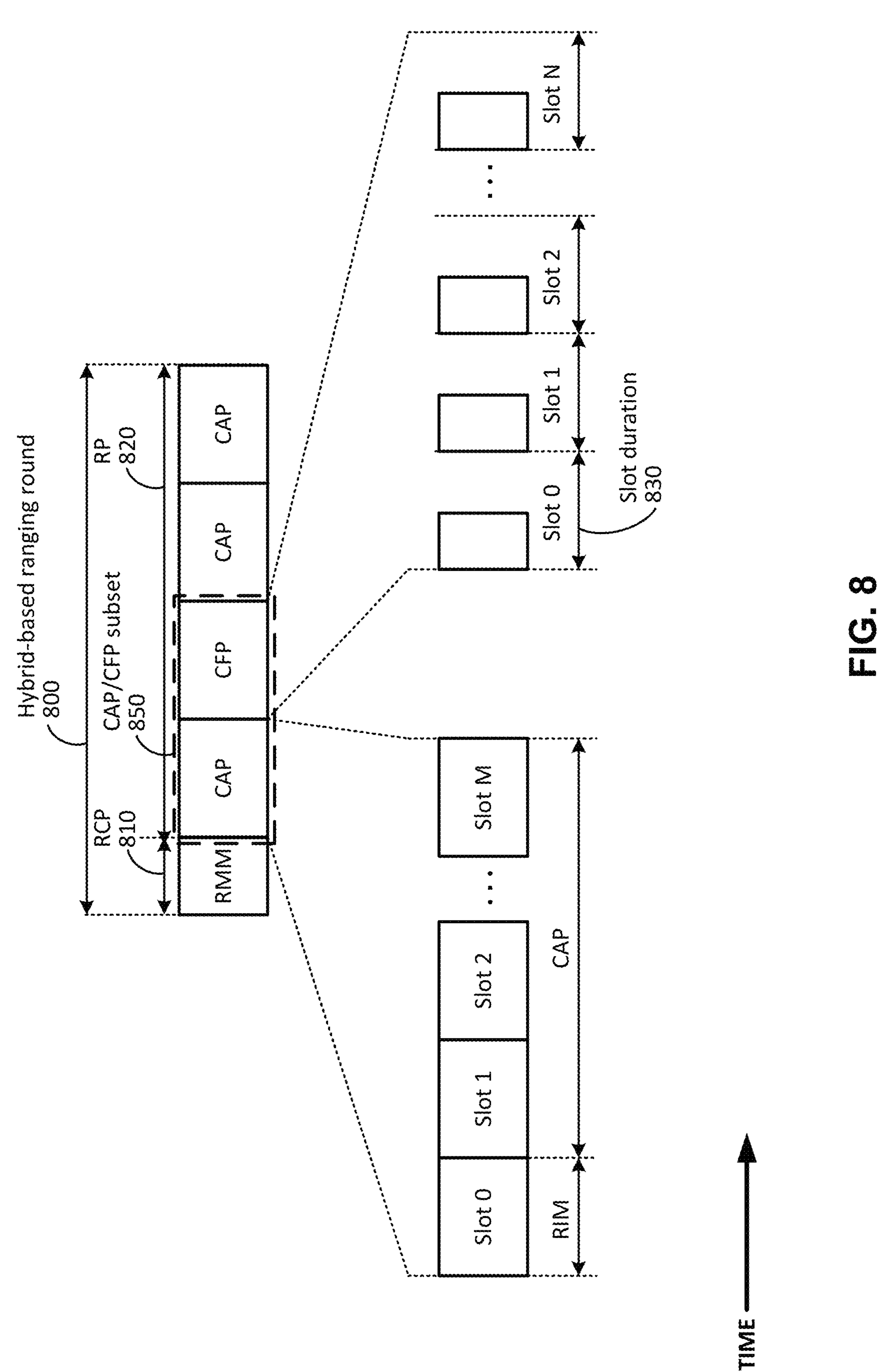
FIG. 8 is a timing diagram of a hybrid-based ranging round, provided to show how embodiments may implement a process for moving a UWB responder device from a CAP to a contention-free period (CFP).

FIG. 8 is a timing diagram of a hybrid-based ranging round 800, provided to illustrate how embodiments may implement a process for moving a UWB responder device, or tag, from a CAP to a CFP. As previously noted, a hybrid-based ranging round 800 includes one or more CAP and CFP portions. Specifically, the hybrid-based ranging round 800 may comprise a ranging control phase (RCP) 810 (in which a ranging management message (RMM) may be transmitted by the initiator), followed by a ranging phase (RP) 820 comprising one or more CAPs and one or more CFPs. (The RP 820 in FIG. 8 has two CAPs and two CFPs, but numbers may vary. The RMM may indicate start/end of each of the CAPs and CFPs. A pair of CAP/CFPs may be referred to as a CAP/CFP subset 850. A hybrid-based ranging round 800 may have one or more CAP/CFP subsets 850.) According to embodiments, the CAP may be used for unknown responders that will potentially send response messages (e.g., as described above with respect to FIGS. 7A/7B), while the CFP (comprising a series of slots having slot duration 830 in which transmissions may be made) may be used for scheduled transmissions comprising synchronization between anchors for DL-TDoA and/or UL transmissions by known tags for UL-TDOA. Control messages in the first slots (Slot 0) of each of the CAP and CFP portions can indicate the scheduling of the slots within each of the respective portions. According to some embodiments, a controller may still maintain an RML and reserve a portion of the CAP for devices on the RML. It may therefore be up to the controller to determine whether to move devices from a reserved portion of the CAP to the CFP.

In some embodiments, UWB controllers and/or UWB controlees may be communicatively coupled with one or more servers. In such embodiments, the one or more servers may be referred to as a Connected Intelligent Edge (CIE) or, more generically, a "UWB management server," and may be used to manage UWB devices and coordinate UWB positioning sessions. According to some embodiments, the CIE may be privately managed, and/or may comprise a cloud-based service accessible to UWB devices. According to some embodiments, the functionality of the CIE may be executed by a single physical computer (e.g., a computer server). In some implementations, the functionality provided by the CIE may be provided on a subscription-based basis.

Figure 9:
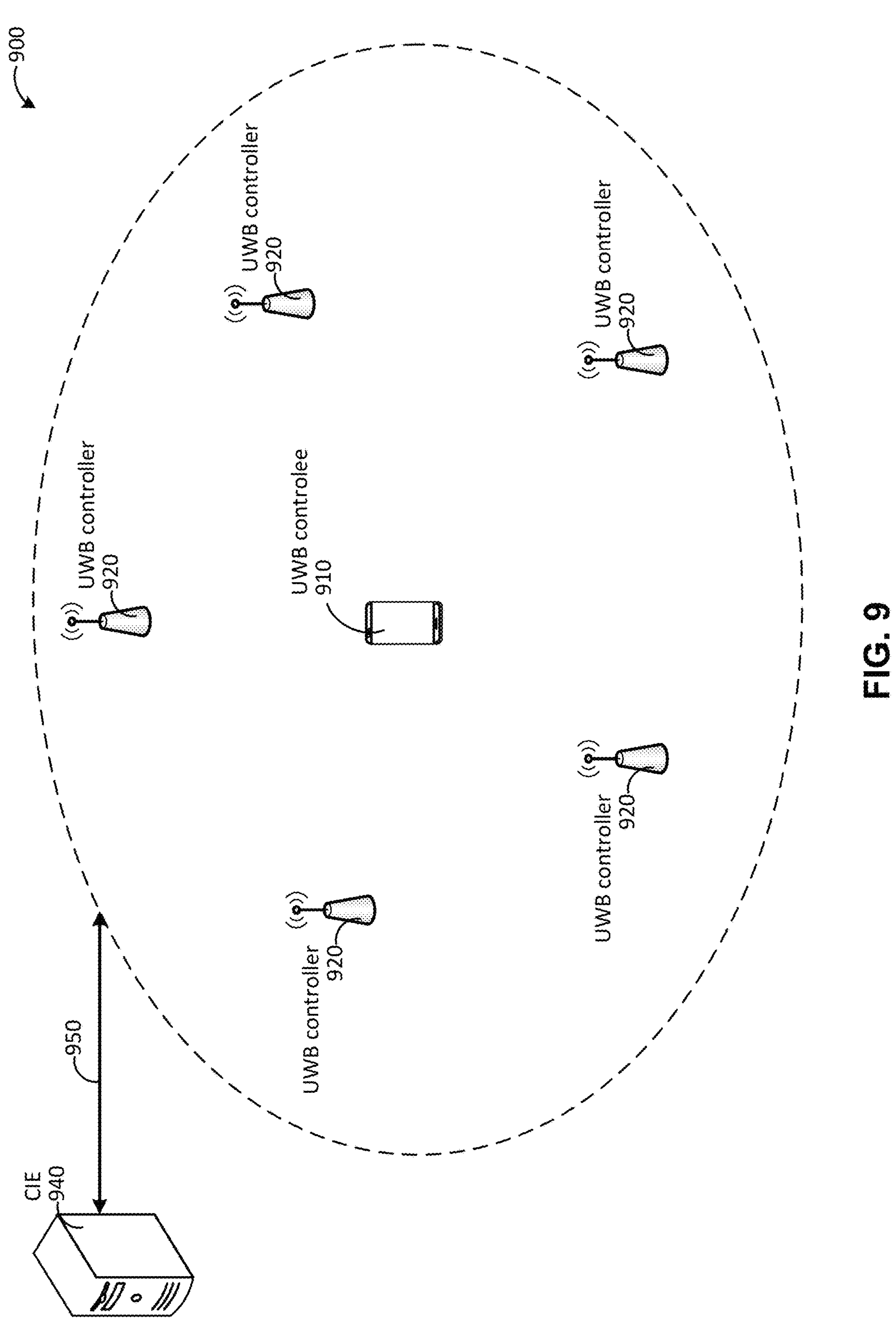
FIG. 9 is a diagram of an example scenario in which a server and UWB devices may utilize cloud-based or server-based UWB positioning, according to some embodiments.

FIG. 9 is a diagram of an example scenario 900 in which a CIE and UWB devices may utilize embodiments described herein for could-based UWB positioning. The scenario 900 includes one UWB controlee 910, multiple UWB controllers 920, and a CIE 940 that is communicatively coupled with the UWB controllers 920 (and, in some scenarios, the UWB controlee 910) via a connection 950. The connection 950 may represent one or more wireless technologies (e.g., Wi-Fi, cellular, etc.), intermediary devices, communication networks (e.g., public/private networks, the Internet, etc.), etc., enabling communication between the CIE 940, the UWB controllers 920, and (optionally) the UWB controlees 910.

Scenario 900 may represent an established UWB infrastructure. For example, the UWB controllers 920 may comprise anchor devices that may be used for positioning/tracking of UWB devices in a given area or region, and CIE 940 comprises a logical controller of the UWB controllers 920. The UWB controlee 910 may comprise, for example, a mobile device or tag for which positioning or tracking is to be performed. Scenario 900 may represent, for instance, part of a standalone UWB infrastructure in a mall, factory, warehouse, etc. Alternatively, the CIE 940 could be related to a privately-managed server. In this example, the CIE 940 may be in communication with UWB controllers 920 and capable of receiving information such as the RMLs for UWB controllers 920. As noted, in some instances the CIE 940 may not be in communication or initially aware of UWB controlee 910.

According to some embodiments, the CIE 940 can be used to configure UWB controllers 920 in different ways. For example, once known to the CIE 940, UWB controllers 920 may be configured to operate on a given CAP size, and/or to enable time/frequency multiplexing between sessions. UWB controlee 910 may perform positioning sessions with one or more of UWB controllers 920 (e.g., to determine its location and/or allow network determination of its location via TWR, TDOA, and/or other such UWB-based positioning techniques, for example). To do so, as previously described, UWB controlee 910 may, for each UWB controller 920, receive a CAP advertisement from the UWB controller 920 (e.g., broadcast via and OOB message), select a slot in the CAP, and transmit a ranging message in the selected slot. Upon receipt of the ranging message, a UWB controller 920 may identify UWB controlee 910 (e.g., UWB controlee 910 becomes a "known device"). As such, as previously indicated, UWB controlee 910 may then be appended to the respective RML of each UWB controller 920. Once on the RML, the UWB controlee 910 may then be scheduled to have a reserved slot within the CAP of the subsequent round (e.g., a corresponding round of for the UWB session of the UWB controller 920 in the subsequent block). As previously noted, as the number of devices on an RML increases and the number of reserved slots in the CAP increases correspondingly, there may be fewer remaining slots in the CAP for contention-based positioning. This can increase the likelihood of collisions among unknown devices. This can be particularly problematic if there is a surge of unknown devices, such as in asset tracking/industrial environments.

According to embodiments herein, a CIE can be used to make decisions based on information received from UWB controllers (e.g., UWB anchors) to help reduce the likelihood of collisions and make more efficient usage of available bandwidth. This may comprise indicating to UWB controllers when to move a UWB controlee (responder) from a reserved slot in the CAP to a reserved slot in the CFP. In some embodiments, whether a UWB controlee is within overlapping coverage of different UWB controllers. An example of how a CIE may be used to provide such functionality is described with respect to FIG. 10.

Figure 10:
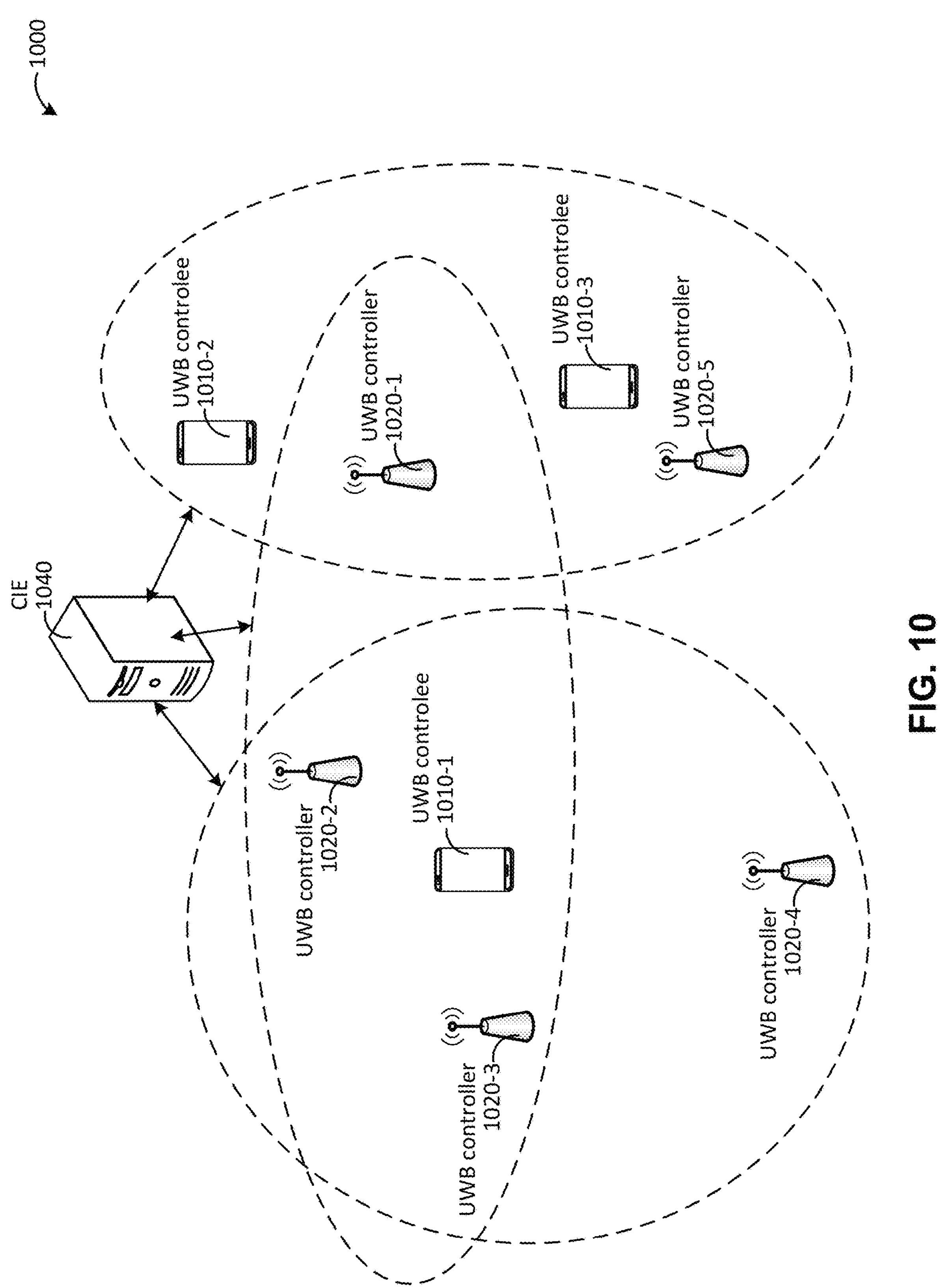
FIG. 10 is a diagram of another example scenario in which a server and UWB devices may utilize cloud-based or server-based UWB positioning, according to some embodiments.

FIG. 10 is a diagram of an example scenario 1000 in which a CIE 1040 may make network-centric or server/cloud-based decisions based on UWB controlees 1010-1, 1010-2, and 1010-3 (collectively and generically referred to herein as UWB controlees 1010) being in overlapping coverage of UWB controllers 1020-1, 1020-2, 1020-3, 1020-4, and 1020-5 (collectively and generically referred to herein as UWB controllers 1020). (Ellipses shown by dashed lines represent coverage area of UWB controllers 1020 within the ellipse.) The CIE 1040 may send a request to UWB controllers 1020 for a list of devices within the coverage of each UWB controller 1020 (e.g., the RML of each UWB controller 1020). The CIE 1040 can then monitor the number of overlapping devices between various anchors. In this particular scenario, UWB controlee 1010-1 may appear in the RML of UWB controllers 1020-1, 1020-2, 1020-3, and 1020-4. However, there may be other unknown/known devices such as UWB controlees 1010-2 and 1010-3 that want to join a UWB session with UWB controller 1020-1.

The CIE 1040 can then help UWB controllers 1020 perform device management. For example, the CIE 1040 may observe that it may not be necessary for UWB controlee 1010-1 to occupy a slot within the CAP of the UWB session of UWB controller 1020-1. To enable reduced contention for UWB controlees 1010-2 and 1010-3, the CIE 1040 may configure UWB controller 1020-1 to either (i) move UWB controlee 1010-1 to a CFP slot (freeing up an additional slot in the CAP) or (ii) terminate the session with UWB controlee 1010-1 (in which case the position of UWB controlee 1010-1 may still be determined in view of its participation in UWB positioning sessions with UWB controllers 1020-2, 1020-3, and 1020-4).

According to some embodiments, a CIE may define one or more decision metrics that can be used to determine what action should be performed by one or more UWB controllers. In particular, whether a UWB controller (e.g., anchor) should move a controlee/responder from a reserved slot in the CAP to a reserved slot in the CFP. In scenario 1000, the CIE 1040 may define a threshold related to the maximum number of devices (UWB controlees 1010) in the CAP (e.g., known devices on the RML having reserved slots in the CAP) and may further configure UWB controllers 1020 with this threshold. When the threshold is reached for a certain UWB controller (e.g., UWB controller 1020-1), the CIE 1040 may identify devices like UWB controlee 1010-1 that can be moved into the CFP of that anchor's session. Example embodiments that employ this process are provided below.

Figure 11:
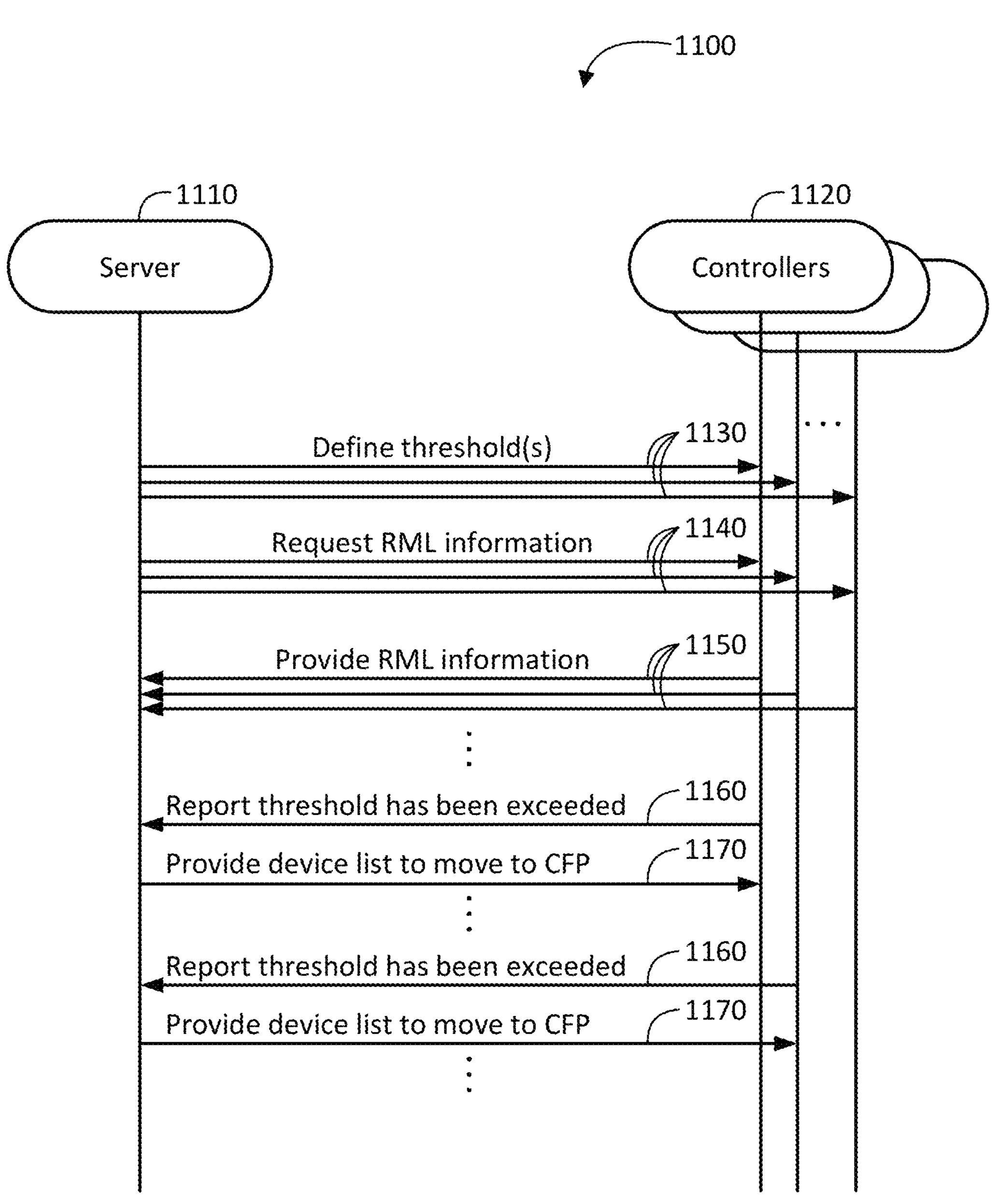
FIG. 11 is a diagram illustrating an example message flow, according to an embodiment.

FIG. 11 is a diagram illustrating an example message flow of a process 1100 performed by a server 1110 (e.g., a CIE or other UWB management server) and a plurality of UWB controllers 1120 (e.g., anchors) for enabling network-centric or server/cloud-based decisions, according to an embodiment. In this process 1100, messages between the server 1110 and controllers 1120 may be communicated using one or more OOB technologies (e.g., Bluetooth, Wi-Fi, Ethernet, NR, etc.). As illustrated with arrows 1130, the server 1110 may define thresholds and send messages indicative of these thresholds to the various UWB controllers 1120. These thresholds may be uniform (e.g., across all controllers 1120 or a subgroup of controllers 1120), may be specific to particular controllers 1120, or combination thereof. It can be noted that messages may be periodic or aperiodic (e.g., based on certain triggers, schedules, etc.) depending on desired functionality. Moreover, in some embodiments, controllers 1120 may be configured to provide RML information without explicit requests from the server 1110, and/or a single RML request from the server 1110 may cause a given anchor to provide RML information multiple times (e.g., periodically) over a period of time.

Depending on desired functionality, the one or more thresholds may be related to UWB sessions of the controllers 1120. As previously noted, one such threshold may comprise a length of the RML (e.g., a number of known devices having reserved slots in the CAP). Alternatively, a threshold may comprise an average number of devices in the CAP, where the average is taken over time (e.g., a predetermined window of time). Again, these thresholds may be customized for particular controllers 1120, and may account for different capabilities of the different controllers 1120.

As indicated by arrows 1140, the server 1110 also may request RML information from each of the controllers 1120, which may be subsequently provided by the controllers 1120, as indicated by arrows 1150. Similar to the messages defining thresholds, the request for RML information (at arrow 1140) may be sent by the server 1110 periodically, or a periodically, as desired. As previously indicated, the RMLs provided by the controllers 1120 can give the server 1110 visibility to known devices among multiple controllers 1120, which can help inform decisions made by the server 1110.

It can be noted that, according to some embodiments, messages communicated at arrows 1130, 1140, and 1150 in the process 1100 may be communicated at different times to different controllers 1120. That is, in addition or as an alternative to sending (and returning) these messages in batches or in a similar timeframe as illustrated in FIG. 11, embodiments may send these messages to and from individual controllers 1120 in accordance with a different periodicity, timeframe, schedule, etc., which may be individualized to each controller 1120.

As further illustrated in FIG. 11, additional messaging may be exchanged between the server 1110 and controllers 1120 if thresholds (e.g., as defined by the server 1110 and provided to controllers 1120 via the previously-described messages from the server 1110 to the controllers 1120) are exceeded. At arrow 1160, for example, a first controller 1120 may report to the server 1110 that a threshold has been exceeded, and the server 1110 then respond with a list of devices (e.g., UWB responders/controlees) to be moved to the CFP, as shown by arrow 1170. A similar exchange may be made with the server 1110 and with other controllers, as shown in FIG. 11. As previously noted, controllers 1120 may be configured differently by the server 1110 to have different threshold values and/or different types of thresholds based on device capability, relevant statistics over time, and/or other factors. In view of this, and the fact that controllers 1120 are in different locations and may therefore receive responses from different controlees, the device list provided by the server 1110 may vary from controller to controller.

Because a server (e.g., CIE) has access to RML information or multiple controllers, it can make more informed decisions regarding whether to move a device from the CAP to the CFP. This can be based, for example, on maintaining an RML-based threshold (how many RMLs is the device present in), a mobility threshold (how long a device has been camping in a certain geographic region), or a traffic threshold (how often a device transmits a ranging message), or a combination thereof. The server may therefore track RML lists, mobility, or traffic information, or any combination thereof, over time to determine trends (time-based statistics) and/or establish related thresholds.

In the scenario 1000 of FIG. 10, for example, the CIE 1040 may know (e.g., based on historical traffic information for UWB controller 1020-1) that UWB controller 1020-1 may be located at a position where a large number of devices may often arrive at once (e.g., near a docking side of a warehouse). The CIE 1040 may then set a threshold for UWB controller 1020-1 with this in mind, perhaps setting a relatively high threshold for reserved slots in the CAP to accommodate a large number of devices. If UWB controller 1020-1 indicates to the server that this threshold has been met, the CIE 1040 may determine that UWB controlee 1010-1 is on the RML of controllers 1020-2, 1020-3, and 1020 (and perhaps has been for a threshold amount of time, indicating UWB controlee 1010-1 a low-mobility device). Accordingly, the CIE 1040 may then indicate to UWB controller 1020-1 that UWB controlee 1010-1 can be moved from a reserved slot of the CAP (e.g., RML list) of UWB controller 1020-1 to the CFP. (UWB controlee 1010-1 may be included on a list of potentially multiple devices, for example, to be moved from the CAP to the CFP.)

According to some embodiments, some of the logic described above with respect to the CIE/server may be made by the UWB controllers themselves. For example, based on thresholds provided by the server 1110, the controllers 1120 themselves may determine whether to move a device (controlee/responder) from the CAP to the CFP. Thus, according to some embodiments, the messages shown by arrows 1160 and 1170 may not be exchanged. (That said, according to some embodiments, a controller may report an action taken to the server.) To enable controllers to determine whether to move a device from the CAP to the CFP, the CIE can configure comptrollers with thresholds for doing so. For example, the CIE may use two different thresholds: a first threshold comprising a threshold such as the length of the RML or an average number of devices in the CAP, and a second threshold that defines a threshold for determining devices that should be moved from the CAP to the CFP, such as mobility pattern, the traffic pattern of the device, or both. If a controller determines that the first threshold has been exceeded (e.g., triggering a decision to move devices from the CAP to the CFP), the anchor can then use the second threshold to determine which device(s) to move based on for example, which device(s) have triggered the second threshold. Through subsequent RML requests/responses (e.g., as shown in FIG. 11), the CIE can be updated regarding the movement of the device(s) from the CAP to the CFP.

Figure 12:
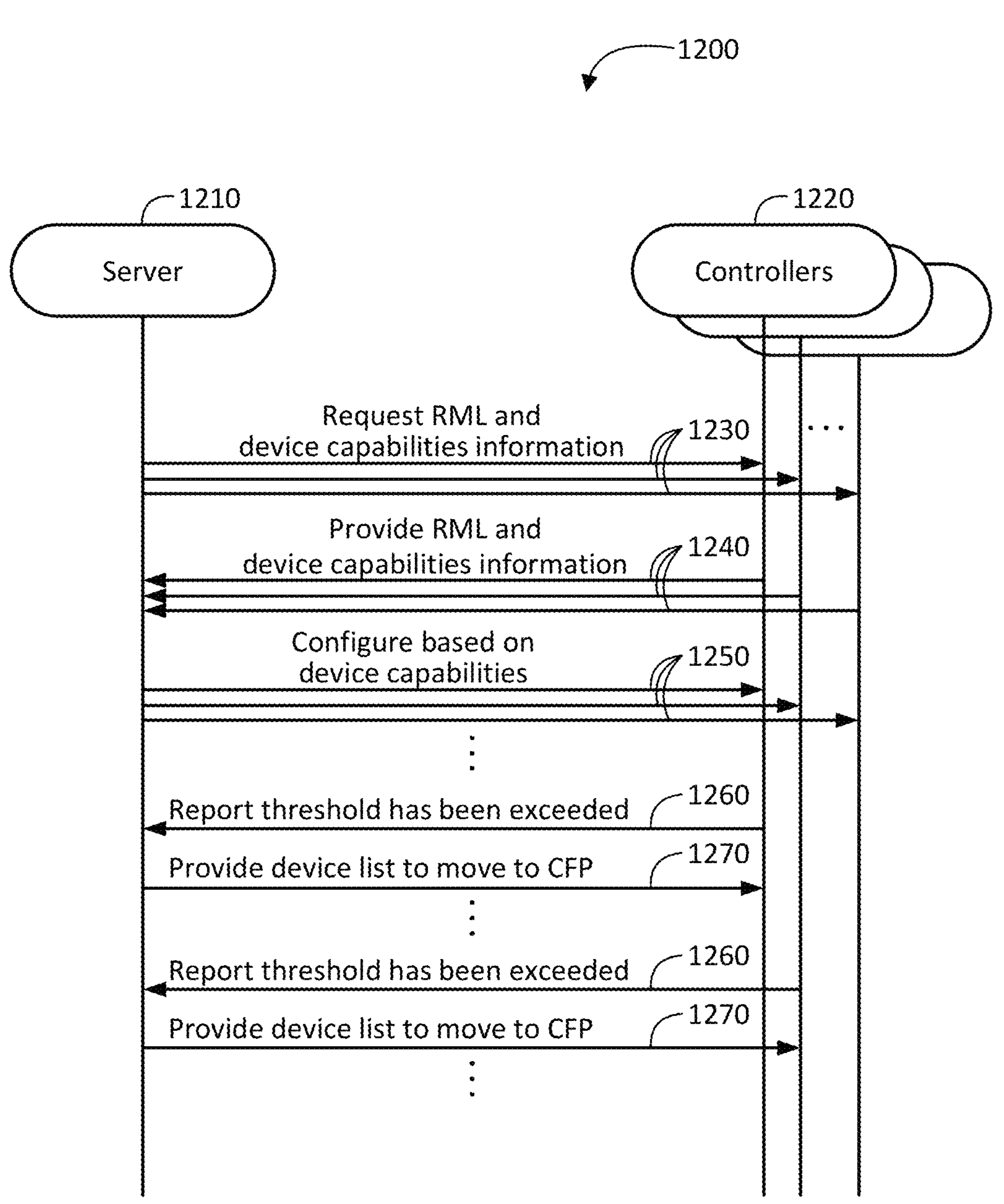
FIG. 12 is a diagram illustrating another example message flow, according to an embodiment.

FIG. 12 illustrates a message flow of another process 1200 that may be performed by server 1210 (e.g., a CIE or other UWB management server, as described herein) and a plurality of UWB controllers 1120 (e.g., anchors) for enabling network-centric or server/cloud-based decisions, according to an embodiment. In many aspects, the process 1200 may be similar to the process 1100 illustrated in FIG. 11. In the process 1200, however, the server 1210 may provide controllers 1220 with additional configuration information, which may be device-specific to each controller 1220. As shown by arrows 1230 and 1240 (which may otherwise be performed similarly to arrows 1140 and 1150, as previously described) server 1210 can request device capabilities information, which the controllers 1220 may provide, each controller 1220 providing its relevant capabilities. As illustrated at arrows 1250, the server 1210 can then configure the controllers 1220 based on device capabilities. For example, capability information can include capabilities of the controllers 1220 for operating on different channels. In this case, the server 1210 may then form a group of controllers 1220 that operate on a common channel. Within a group operating on a common channel, the CIE may configure the controllers 1220 regarding slot allocations and Tx offsets for each of the devices, to reduce interference within the group. An example of this is provided hereafter with respect to FIG. 13, described below. As indicated by arrows 1260 and 1270, controllers 1220 may subsequently report that a threshold has been exceeded, and the server 1210 may respond by providing a device list to move to CFP, in a manner similar to arrows 1160 and 1170 described previously with respect to FIG. 11.

Additionally or alternatively, the server 1210 may maintain time-based statistics on the average number of devices/controlees per anchor and configure the controllers 1220 based on this statistical information. For example, if the server 1210 determines that a particular controller 1220 is being overloaded with devices (e.g., versus historical data and/or data from other controllers 1220), then the server 1210 can adjust the CAP window of the controller 1220 to be larger. (This may be done, for example, in addition to setting a threshold for triggering moving a device from a CAP to a CFP.) This adjustment may be sent in a configuration at arrow 1250.

Figure 13:
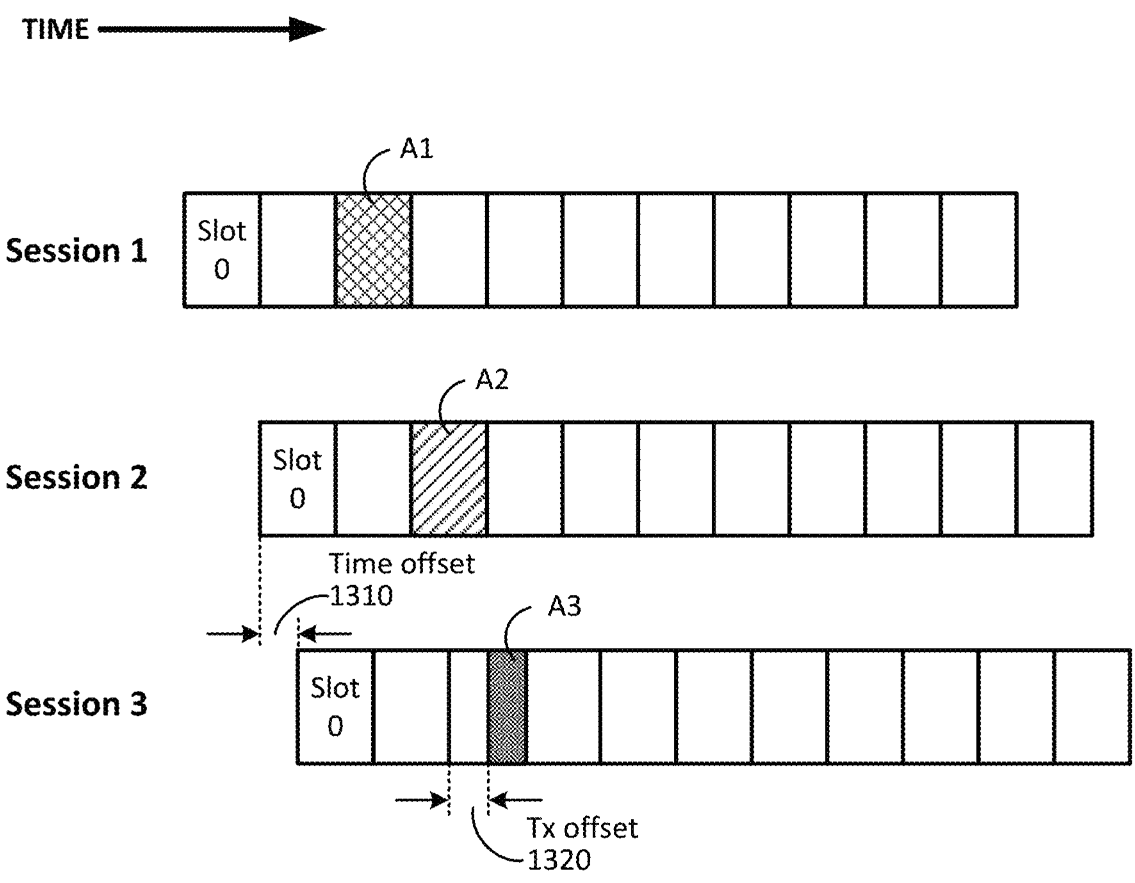
FIG. 13 is a timing diagram illustrating how UWB sessions may be interleaved (multiplexed in time), according to some embodiments.

FIG. 13 is a timing diagram illustrating how UWB sessions may be interleaved (multiplexed in time), according to some embodiments. In particular, a CIE (or other server) can manage devices to help mitigate collisions overlapping in the CAPs (and/or CFPs) of different concurrent sessions. In particular, because the CIE has knowledge of the RMLs of various anchors, it can configure the slot allocation and Tx offset values to prevent collisions between sessions. When moving a device from the CAP to the CFP, for example, the CIE can also preemptively choose a CFP slot and/or Tx offset such that interference is prevented with another session. In the example illustrated in FIG. 13, sessions 1, 2, and 3 are each offset in time, so that corresponding slots A1, A2, and A3, which all have the same slot index, occur at different times. However, the time offset 1310 between session 2 and session 3 is not quite sufficient to ensure slots A2 and A3 do not interfere. As such, an additional Tx offset 1320 may be applied in session 3 to ensure transmissions during the slots do not cause RF collisions. Again, these slot allocations and/or Tx offsets may be configured by the CIE, in some embodiments. Thus, by using a CIE to group anchors and configure slot allocations and/or Tx offsets, sessions may be multiplexed with a low risk of collisions, making efficient use of available RF bandwidth that otherwise (without the CIE) may be less efficient due to collisions.

Figure 14:
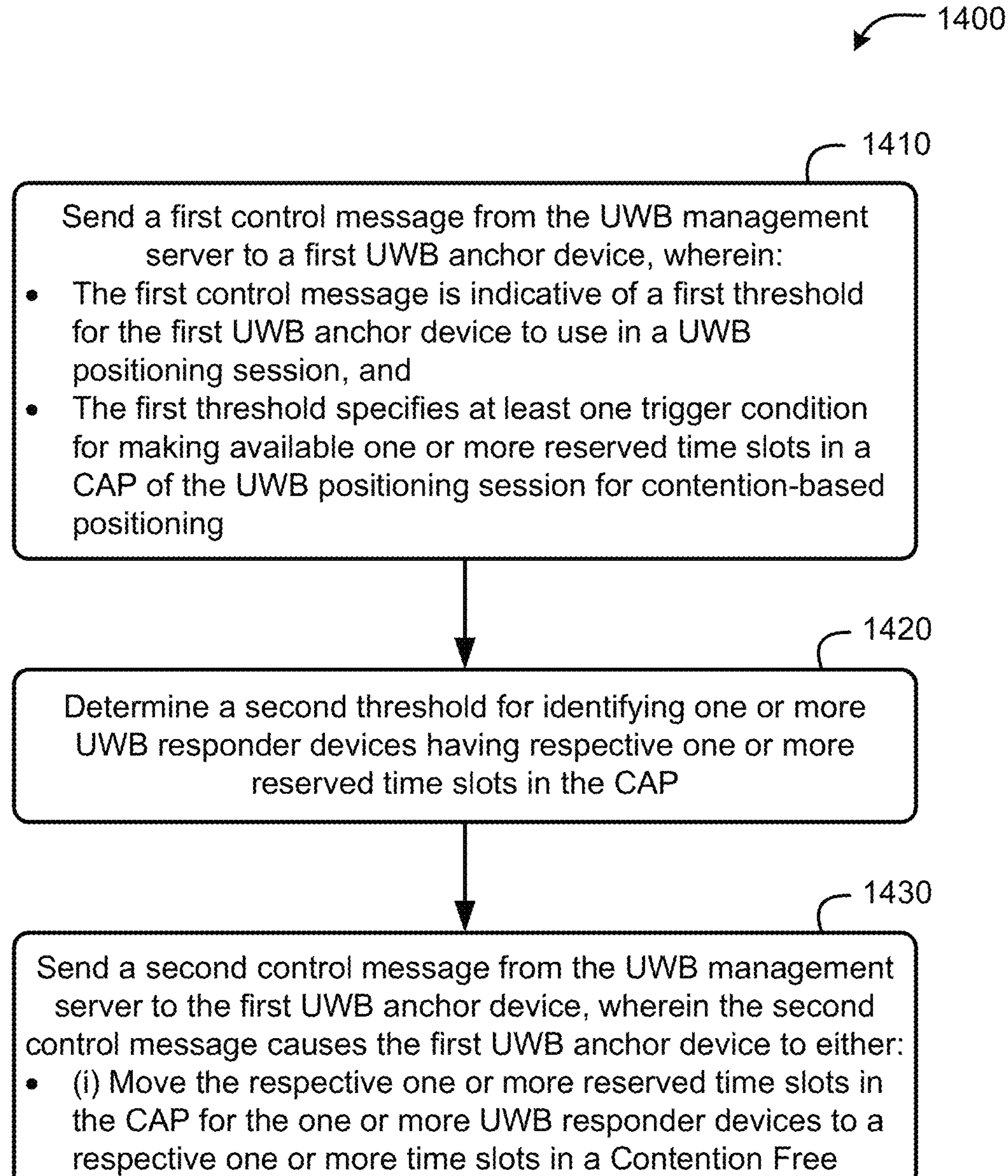
FIG. 14 is a flow diagram of a method of UWB anchor configuration by a UWB management server, according to an embodiment.

FIG. 14 is a flow diagram of a method 1400 of UWB anchor configuration by a UWB management server, according to an embodiment. Aspects of the method 1400 may reflect the functionality of a server as described in relation to FIGS. 11 and 12. Means for performing the functionality illustrated in one or more of the blocks of FIG. 14 may be performed by hardware and/or software components of a UWB management server, such as a CIE or other logical controller, as described herein. Example components of a server are illustrated in FIG. 20, which is described in more detail below.

At block 1410, the functionality comprises sending a first control message from the UWB management server to a first UWB anchor device, wherein the first control message is indicative of a first threshold for the first UWB anchor device to use in a UWB positioning session, and the first threshold specifies at least one trigger condition for making available one or more reserved time slots in a CAP of the UWB positioning session for contention-based positioning. According to some embodiments, the functionality at block 1410 may correspond to the functionality of arrows 1130 of FIG. 11 and/or arrows 1250 of FIG. 12. As noted, a UWB anchor device may comprise a controller as described herein (e.g., with respect to FIGS. 11 and 12). As described above thresholds may be based on information such as device status, statistical information, capabilities, or any combination thereof. As such, as illustrated by arrows 1230 in FIG. 12, a server may request RML information from the UWB anchors/controllers, resulting in a response with RML information, indicated by arrows 1240. Thus, according to some embodiments, the method 1400 may further comprise receiving RML information indicative of a respective RML of each UWB anchor device of a plurality of UWB anchor devices comprising the first UWB anchor device, wherein the second threshold is based at least in part on the RML information. Such embodiments may further rise sending a request for the RML information to the plurality of UWB anchor devices, wherein receiving the RML information is responsive to sending the request. In some embodiments, the first threshold may be based at least in part on a length of an RML of the first UWB anchor device, an average number of devices in the CAP, or both. According to some embodiments, the server comprises a CIE configured to provide each of the at least a subset of a plurality of UWB anchor devices comprising the first UWB anchor device with UWB positioning session configurations.

Figure 20:
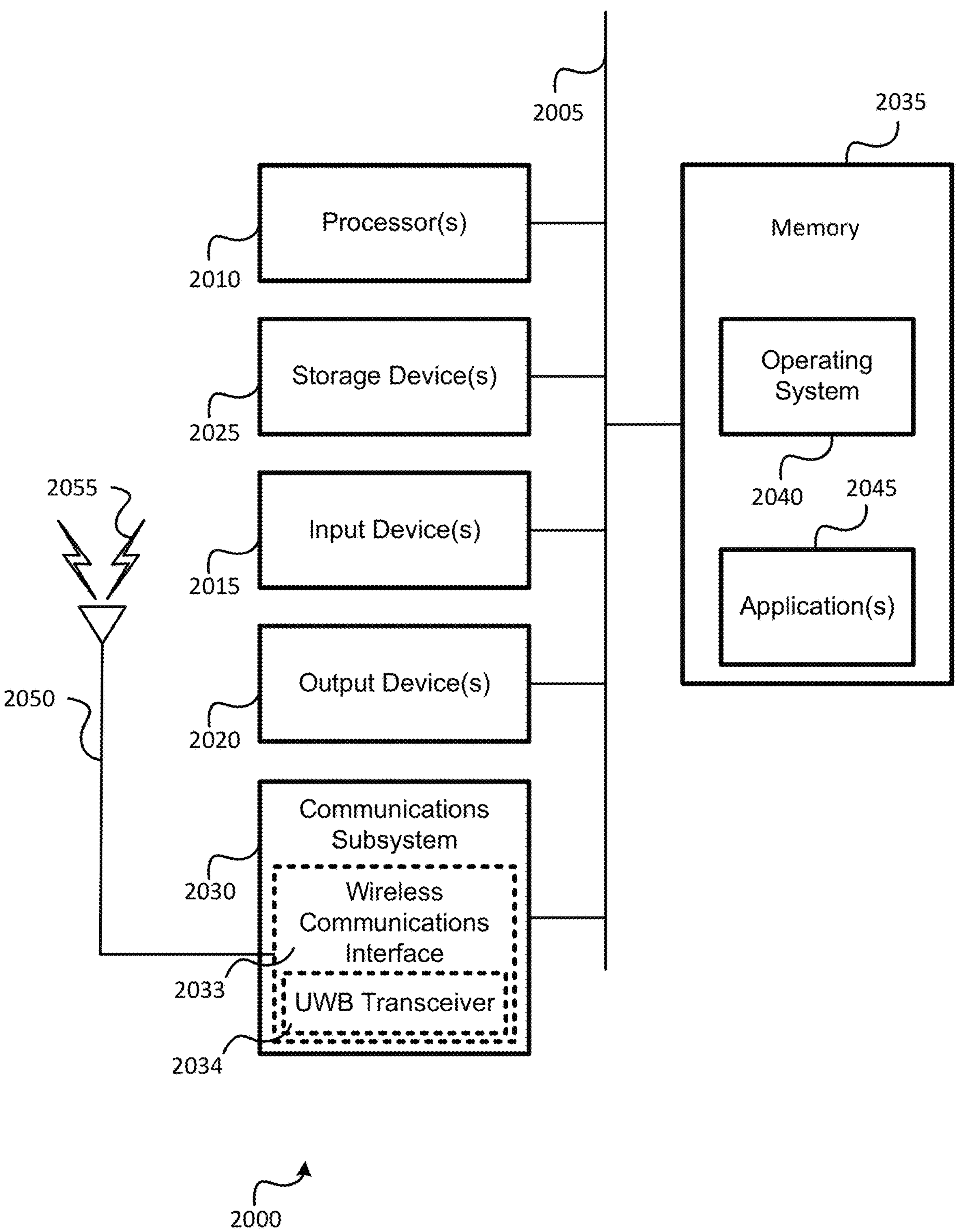
FIG. 20 is a block diagram of an embodiment of a computer system, which can be utilized in embodiments as described herein.

Means for performing functionality at block 1410 may comprise a bus 2005, processor(s) 2010, memory 2035, communications subsystem 2030 (e.g., including optional wireless communication interface 2033 and/or optional UWB transceiver 2034), and/or other components of a computer system 2000, as illustrated in FIG. 20.

At block 1420, the functionality comprises determining a second threshold for identifying one or more UWB responder devices having respective one or more reserved time slots in the CAP. As noted herein, the second threshold may comprise, for example, an RML-based threshold, a mobility threshold, a traffic threshold, or a combination thereof. This determination may be made, for example, based on a report from the first UWB anchor device that indicates the first threshold has been exceeded (e.g., as indicated by arrows 1160 in FIG. 11 and arrows 1260 in FIG. 12). Means for performing functionality at block 1420 may comprise a bus 2005, processor(s) 2010, memory 2035, communications subsystem 2030 (e.g., including optional wireless communication interface 2033 and/or optional UWB transceiver 2034), and/or other components of a computer system 2000, as illustrated in FIG. 20.

At block 1430, the functionality comprises sending a second control message from the UWB management server to the first UWB anchor device, wherein the second control message causes the first UWB anchor device to either: (i) move the respective one or more reserved time slots in the CAP for the one or more UWB responder devices to a respective one or more time slots in a CFP of the UWB positioning session, or (ii) terminate the UWB positioning session with the one or more UWB responder devices. According to some embodiments, this may correspond with arrows 1170 of FIG. 11 and/or arrows 1270 of FIG. 12 Termination of the UWB positioning session may be chosen if there are a few time slots remaining in the CFP, for example. According to some embodiments, sending the second control message from the UWB management server to the first UWB anchor device a be responsive to receiving a message at the UWB management server from the first UWB anchor device indicating the first threshold has been exceeded (again, as indicated by arrows 1160 and 1260 of FIGS. 11 and 12), and identifying, at the UWB management server, the one or more UWB responder devices using the second threshold. According to some embodiments, the second control message may identify the one or more UWB responder devices to the first UWB anchor device. According to some embodiments, the second control message may provide the second threshold to the first UWB anchor device. According to some embodiments, the method may further comprise receiving, at the UWB management server from the first UWB anchor device, capability information of the first UWB anchor device, and sending a configuration message to the first UWB anchor device based at least in part on the capability information of the first UWB anchor device. Configuration information may vary, depending on desired functionality. According to some embodiments, the configuration message may comprise a specified size for the CAP, a specified size for the CFP, a reserved time slot for a UWB responder device of the one or more UWB responder devices, a Tx offset for a UWB responder device of the one or more UWB responder devices, or a combination thereof.

Means for performing functionality at block 1430 may comprise a bus 2005, processor(s) 2010, memory 2035, communications subsystem 2030 (e.g., including optional wireless communication interface 2033 and/or optional UWB transceiver 2034), and/or other components of a computer system 2000, as illustrated in FIG. 20.

Figure 15:
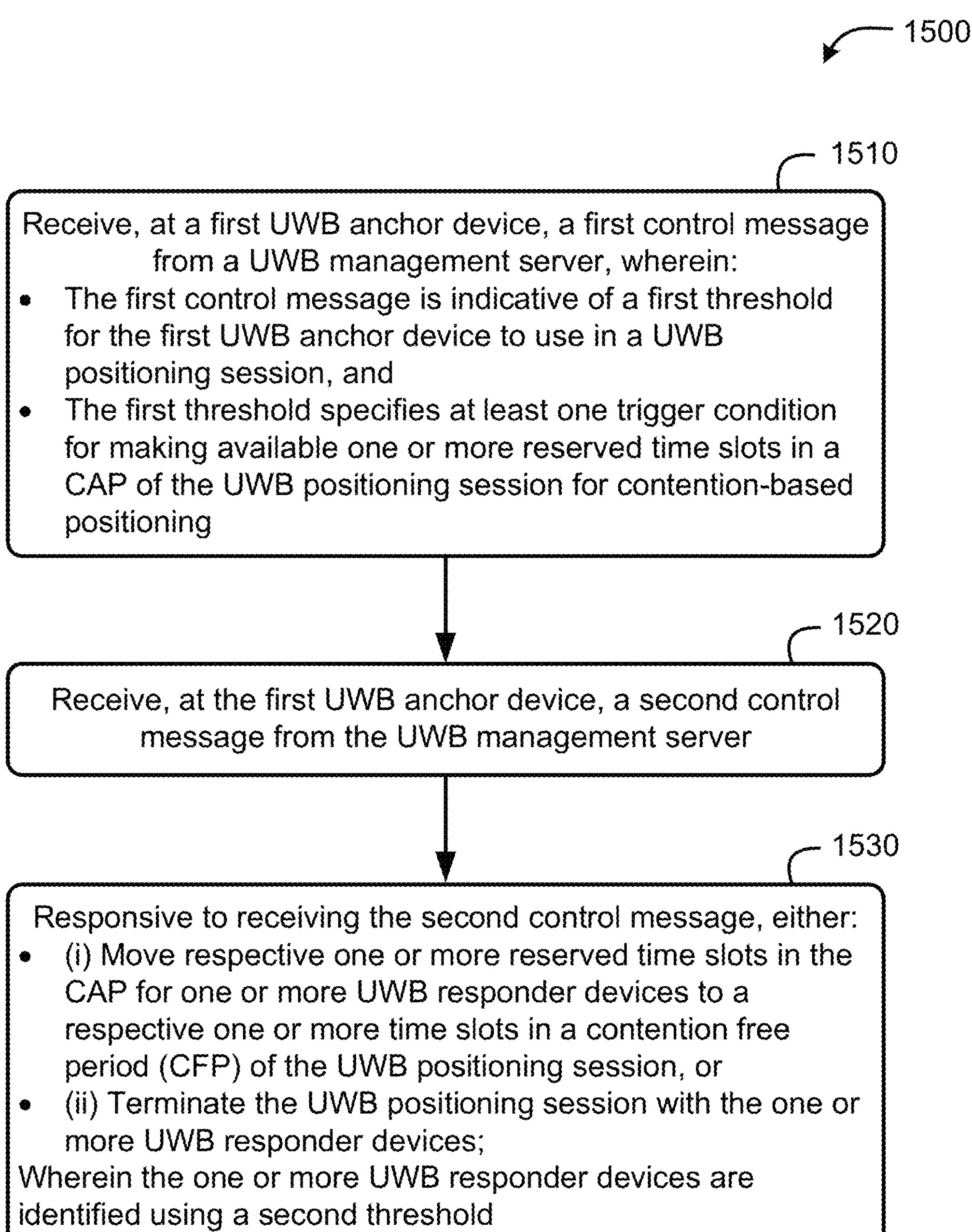
FIG. 15 is a flow diagram of a method of UWB positioning session prioritization for a first UWB device, according to an embodiment.

FIG. 15 is a flow diagram of a method 1500 of UWB positioning session prioritization for a first UWB device, according to an embodiment. Aspects of the method 1500 may reflect operations performed by a controller or UWB anchor, as described in the embodiments above. Moreover, aspects of the method 1500 may reflect operations performed by a first UWB device in conjunction with the operations of method 1400 performed by a UWB management server. Means for performing the functionality illustrated in one or more of the blocks as of own in FIG. 15 may be performed by hardware and/or software components of a mobile UWB device or stationary UWB device. Example components of a mobile UWB device and a stationary UWB device are respectively illustrated in FIGS. 18 and 19, which are described in more detail below.

At block 1510, the functionality comprises receiving, at a first UWB anchor device, a first control message from a UWB management server, wherein: the first control message is indicative of a first threshold for the first UWB anchor device to use in a UWB positioning session, and the first threshold specifies at least one trigger condition for making available one or more reserved time slots in a CAP of the UWB positioning session for contention-based positioning. Again, the first control message may correspond to arrows 1130 of FIG. 11 and/or arrows 1250 of FIG. 12. As previously noted, the first threshold may be based at least in part on a length of an RML of the first UWB anchor device, an average number of devices in the CAP, or both. As such, the first UWB anchor device may provide the RML and/or other information to enable the UWB management server to the first threshold. Thus, some embodiments may further comprise sending, from the first UWB anchor device, RML information to the UWB management server, the RML information indicative of an RML of the first UWB anchor device, wherein the second threshold is based at least in part on the RML information. In such embodiments, sending the RML information may be responsive to receiving, at the first UWB anchor device, a request for the RML information from the UWB management server. In some embodiments, the UWB management server may provide a configuration to the first UWB anchor device, which may be in first control message, or may be in a separate configuration message, functionality. This may be based on a capability request/response, as indicated in arrows 1230 and 1240 of FIG. 12. Thus, some embodiments of the method 1500 may further comprise sending, from the first UWB anchor device to the UWB management server, capability information of the first UWB anchor device, and receiving, at the first UWB anchor device from the UWB management server, a configuration message based at least in part on the capability information of the first UWB anchor device. To some embodiments, the configuration message may comprise a specified size for the CAP, a specified size for the CFP, a reserved time slot for a UWB responder device of the one or more UWB responder devices, a Tx offset for a UWB responder device of the one or more UWB responder devices, or a combination thereof.

Figure 18:
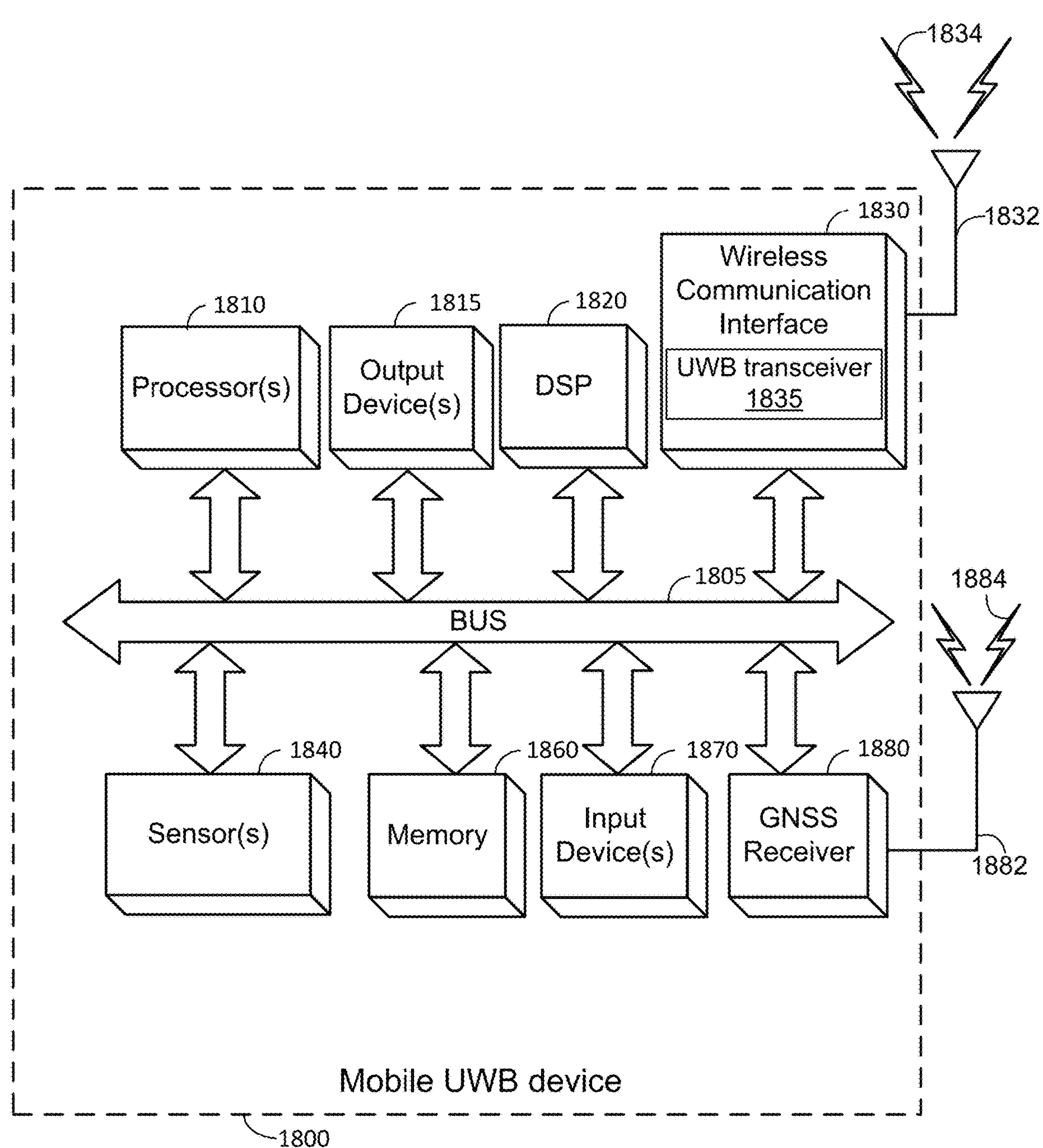
FIG. 18 is a block diagram of an embodiment of a mobile UWB device, which can be utilized in embodiments as described herein.
Figure 19:
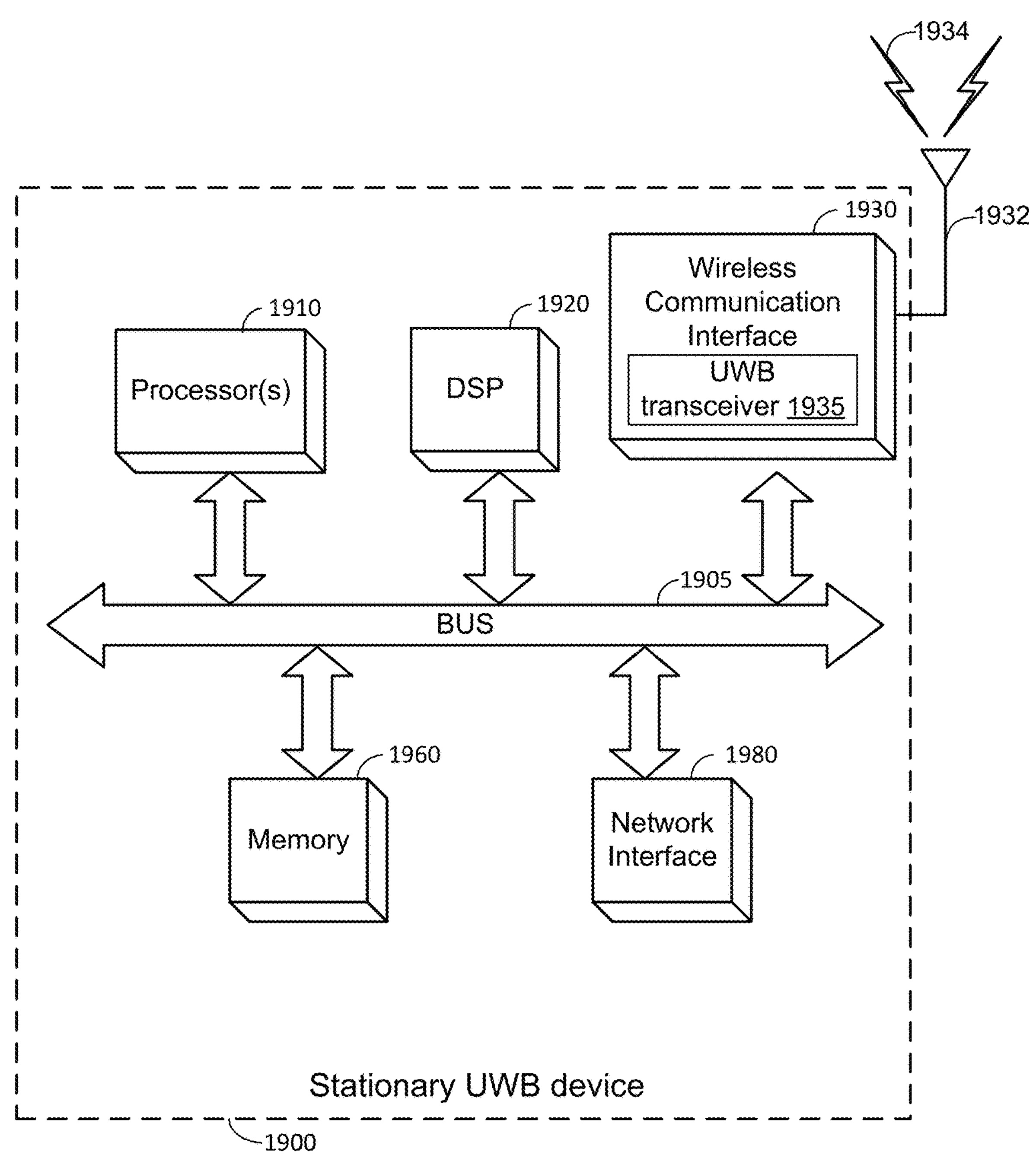
FIG. 19 is a block diagram of an embodiment of a stationary UWB device, which can be utilized in embodiments as described herein.

Means for performing functionality at block 1510 may comprise a bus 1805, processor(s) 1810, DSP 1820, memory 1860, wireless communication interface 1830 (e.g., including UWB transceiver 2034), and/or other components of a mobile UWB device 1800, as illustrated in FIG. 18. Additionally or alternatively, means for performing functionality at block 1510 may comprise a bus 1905, processor(s) 1910, DSP 1920, memory 1960, wireless communication interface 1930 (e.g., including UWB transceiver 1935), and/or other components of a stationary UWB device 1900, as illustrated in FIG. 19.

At block 1520, the functionality comprises receiving, at the first UWB anchor device, a second control message from the UWB management server. Again, the second control message may correspond to arrows 1170 of FIG. 11 and/or arrows 1270 of FIG. 12. This may be responsive to the first UWB anchor device determining that a threshold has been exceeded, and reporting the same to the UWB management server, as indicated at arrows 1160 and 1260 of FIGS. 11 and 12. As such, some embodiments may further comprise, prior to receiving the second control message from the UWB management server: determining, at the first UWB anchor device, the first threshold has been exceeded. and sending a message from the first UWB anchor device to the UWB management server indicating the first threshold has been exceeded. In such embodiments, the second control message may identify the one or more UWB responder devices to the first UWB anchor device. In some embodiments, the second control message may provide the second threshold to the first UWB anchor device.

Means for performing functionality at block 1520 may comprise a bus 1805, processor(s) 1810, DSP 1820, memory 1860, wireless communication interface 1830 (e.g., including UWB transceiver 2034), and/or other components of a mobile UWB device 1800, as illustrated in FIG. 18. Additionally or alternatively, means for performing functionality at block 1520 may comprise a bus 1905, processor(s) 1910, DSP 1920, memory 1960, wireless communication interface 1930 (e.g., including UWB transceiver 1935), and/or other components of a stationary UWB device 1900, as illustrated in FIG. 19.

At block 1530, the functionality comprises, responsive to receiving the second control message, either: (i) moving respective one or more reserved time slots in the CAP for one or more UWB responder devices to a respective one or more time slots in a contention-free period (CFP) of the UWB positioning session, or (ii) terminating the UWB positioning session with the one or more UWB responder devices, wherein the one or more UWB responder devices are identified using a second threshold. As noted herein, the second threshold may comprise, for example, an RML-based threshold, a mobility threshold, a traffic threshold, or a combination thereof.

Means for performing functionality at block 1530 may comprise a bus 1805, processor(s) 1810, DSP 1820, memory 1860, wireless communication interface 1830 (e.g., including UWB transceiver 2034), and/or other components of a mobile UWB device 1800, as illustrated in FIG. 18. Additionally or alternatively, means for performing functionality at block 1530 may comprise a bus 1905, processor(s) 1910, DSP 1920, memory 1960, wireless communication interface 1930 (e.g., including UWB transceiver 1935), and/or other components of a stationary UWB device 1900, as illustrated in FIG. 19.

Figure 16:
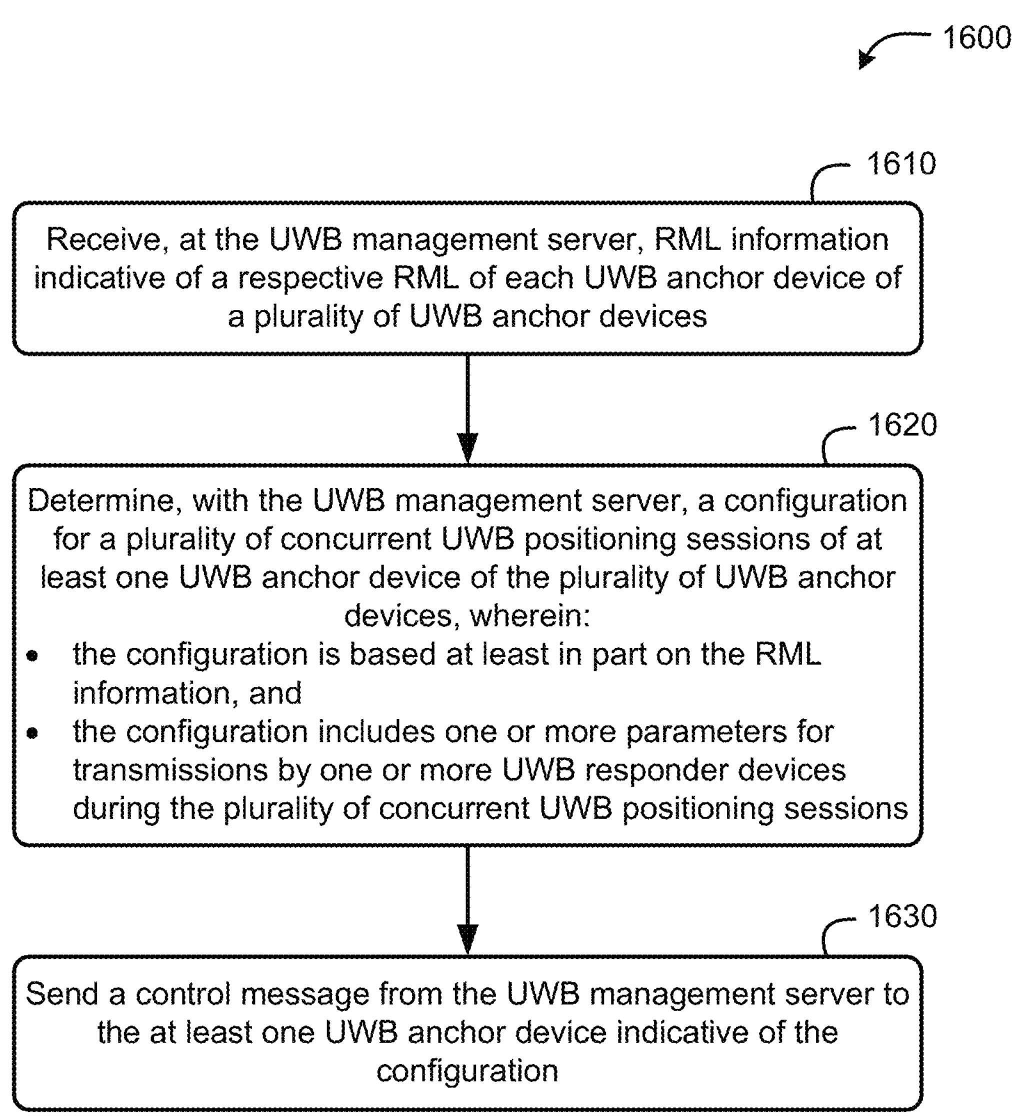
FIG. 16 is a flow diagram of a method 1600 of UWB anchor configuration by a UWB management server, according to an embodiment.

FIG. 16 is a flow diagram of a method 1600 of UWB anchor configuration by a UWB management server, according to an embodiment. Aspects of the method 1600 may reflect the functionality of server as described in relation to FIGS. 11 and 12, for example, in which multiple UWB sessions are performed at the same time. Means for performing the functionality illustrated in one or more of the blocks of FIG. 14 may be performed by hardware and/or software components of a UWB management server, such as a CIE or other logical controller, as described herein. Example components of a server are illustrated in FIG. 20, which is described in more detail below.

At block 1610, the functionality comprises receiving, at the UWB management server, RML information indicative of a respective RML of each UWB anchor device of a plurality of UWB anchor devices. Again, this may correspond with the functionality illustrated by arrows 1140 and 1240 of FIGS. 11 and 12, discussed above. As described herein, receipt of RML information from each of a plurality of UWB anchor devices can enable the UWB management server to optimize UWB positioning across the plurality of UWB anchor devices. Means for performing functionality at block 1610 may comprise a bus 2005, processor(s) 2010, memory 2035, communications subsystem 2030 (e.g., including optional wireless communication interface 2033 and/or optional UWB transceiver 2034), and/or other components of a computer system 2000, as illustrated in FIG. 20.

At block 1620, the functionality comprises determining, with the UWB management server, a configuration for a plurality of concurrent UWB positioning sessions of at least one UWB anchor device of the plurality of UWB anchor devices, wherein: the configuration is based at least in part on the RML information, and the configuration includes one or more parameters for transmissions by one or more UWB responder devices during the plurality of concurrent UWB positioning sessions. According to some embodiments, one or more parameters may include a slot allocation in a UWB positioning session of the plurality of concurrent UWB positioning sessions reserved for a UWB responder device of the one or more UWB responder devices. In such embodiments, the slot allocation may be for a reserved time slot in a CAP in the UWB positioning session. Additionally or alternatively, the slot allocation may be for a reserved time slot in a CFP in the UWB positioning session. According to some embodiments, the one or more parameters may include a Tx offset for a UWB positioning session of the plurality of concurrent UWB positioning sessions. According to some embodiments the configuration may further include, to the at least one UWB anchor device, to move a reserved time slot for a UWB responder device of the one or more UWB responder devices from a CAP to a CFP. As described with respect to FIG. 13, one or more of these features may help reduce RF interference between multiple UWB sessions.

Means for performing functionality at block 1620 may comprise a bus 2005, processor(s) 2010, memory 2035, communications subsystem 2030 (e.g., including optional wireless communication interface 2033 and/or optional UWB transceiver 2034), and/or other components of a computer system 2000, as illustrated in FIG. 20.

At block 1630, the functionality comprises sending a control message from the UWB management server to the at least one UWB anchor device indicative of the configuration. This functionality may correspond to arrows 1250 and/or 1260 of FIG. 12, for example. Means for performing functionality at block 1630 may comprise a bus 2005, processor(s) 2010, memory 2035, communications subsystem 2030 (e.g., including optional wireless communication interface 2033 and/or optional UWB transceiver 2034), and/or other components of a computer system 2000, as illustrated in FIG. 20.

Figure 17:
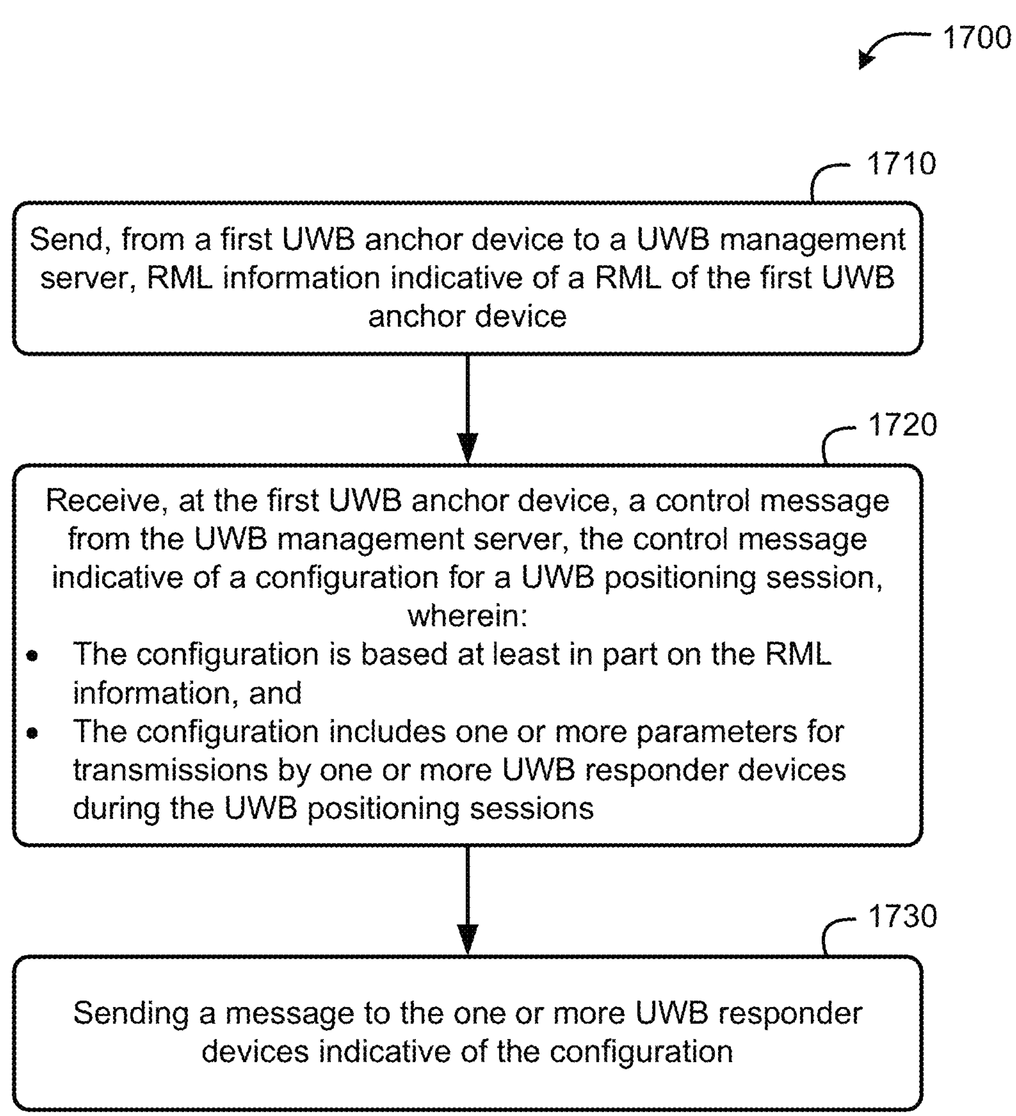
FIG. 17 is a flow diagram of a method of UWB anchor configuration, according to an embodiment.

FIG. 17 is a flow diagram of a method 1700 of UWB anchor configuration, according to an embodiment. Aspects of the method 1700 may reflect operations performed by a controller or UWB anchor, as described in the embodiments above. Moreover, aspects of the method 1700 may reflect operations performed by a UWB anchor device in conjunction with the operations of method 1600 performed by a UWB management server. Means for performing the functionality illustrated in one or more of the blocks as of own in FIG. 17 may be performed by hardware and/or software components of a mobile UWB device or stationary UWB device. Example components of a mobile UWB device and a stationary UWB device are respectively illustrated in FIGS. 18 and 19, which are described in more detail below.

At block 1710, the functionality comprises sending, from a first UWB anchor device to a UWB management server, RML information indicative of an RML of the first UWB anchor device. This functionality may correspond to the functionality illustrated at arrows 1150 of FIG. 11 and/or arrows 1230 of FIG. 12. In some embodiments, this information may be provided in response to a request UWB management server. As indicated elsewhere herein, the RML information may be indicative of UWB responder devices known to the first UWB anchor device.

Means for performing functionality at block 1710 may comprise a bus 1805, processor(s) 1810, DSP 1820, memory 1860, wireless communication interface 1830 (e.g., including UWB transceiver 2034), and/or other components of a mobile UWB device 1800, as illustrated in FIG. 18. Additionally or alternatively, means for performing functionality at block 1710 may comprise a bus 1905, processor(s) 1910, DSP 1920, memory 1960, wireless communication interface 1930 (e.g., including UWB transceiver 1935), and/or other components of a stationary UWB device 1900, as illustrated in FIG. 19.

At block 1720, the functionality comprises receiving, at the first UWB anchor device, a control message from the UWB management server, the control message indicative of a configuration for a UWB positioning session, wherein the configuration is based at least in part on the RML information, and the configuration includes one or more parameters for transmissions by one or more UWB responder devices during the UWB positioning sessions. This functionality may correspond to arrows 1250 of FIG. 12, for example. According to some embodiments, the one or more parameters include a slot allocation in the UWB positioning session reserved for a UWB responder device of the one or more UWB responder devices. In such embodiments, the slot allocation may be for a reserved time slot in a CAP in the UWB positioning session. Additionally or alternatively, the slot allocation may be for a reserved time slot in a CFP in the UWB positioning session. According to some embodiments, the one or more parameters may include a Tx offset for the UWB positioning session. According to some embodiments, the configuration further may include an indication to move a reserved time slot for a UWB responder device of the one or more UWB responder devices from a CAP to a CFP in the UWB positioning session.

Means for performing functionality at block 1720 may comprise a bus 1805, processor(s) 1810, DSP 1820, memory 1860, wireless communication interface 1830 (e.g., including UWB transceiver 2034), and/or other components of a mobile UWB device 1800, as illustrated in FIG. 18. Additionally or alternatively, means for performing functionality at block 1720 may comprise a bus 1905, processor(s) 1910, DSP 1920, memory 1960, wireless communication interface 1930 (e.g., including UWB transceiver 1935), and/or other components of a stationary UWB device 1900, as illustrated in FIG. 19.

At block 1730, the functionality comprises sending a message to the one or more UWB responder devices indicative of the configuration. Depending on the contents of the configuration, the message to the one or more UWB responder devices may be indicative of a reserved slot in a CAP or CFP in the UWB positioning session for a UWB responder device. According to some embodiments, the message may be indicative of a termination of the UWB positioning session for a UWB responder device.

Means for performing functionality at block 1730 may comprise a bus 1805, processor(s) 1810, DSP 1820, memory 1860, wireless communication interface 1830 (e.g., including UWB transceiver 2034), and/or other components of a mobile UWB device 1800, as illustrated in FIG. 18. Additionally or alternatively, means for performing functionality at block 1730 may comprise a bus 1905, processor(s) 1910, DSP 1920, memory 1960, wireless communication interface 1930 (e.g., including UWB transceiver 1935), and/or other components of a stationary UWB device 1900, as illustrated in FIG. 19.

FIG. 18 is a block diagram of an embodiment of a mobile UWB device 1800, which can be utilized as described herein above. For example, mobile UWB device 1800 may operate as a tag, target UWB device, responder device, or controlee, as described herein. Additionally or alternatively, mobile UWB device 1800 may operate as a UWB anchor or controller, as described herein. In some embodiments, the mobile UWB device 1800 may even operate as a CIE or UWB management server, as described herein. It should be noted that FIG. 18 is meant only to provide a generalized illustration of various components, any or all of which may be utilized as appropriate. For example, more basic/simple types of UWB devices may omit various components that may be included in more advanced/complex UWB devices. Furthermore, as previously noted, the functionality of the UE discussed in the previously described embodiments may be executed by one or more of the hardware and/or software components illustrated in FIG. 18.

The mobile UWB device 1800 is shown comprising hardware elements that can be electrically coupled via a bus 1805 (or may otherwise be in communication, as appropriate). The hardware elements may include a processor(s) 1810 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1810 may comprise one or more processing units, which may be housed in a single integrated circuit (IC) or multiple ICs. As shown in FIG. 18, some embodiments may have a separate DSP 1820, depending on desired functionality. Location determination and/or other determinations based on wireless communication may be provided in the processor(s) 1810 and/or wireless communication interface 1830 (discussed below). The mobile UWB device 1800 also can include one or more input devices 1870, which can include without limitation one or more keyboards, touch screens, touch pads, microphones, buttons, dials, switches, and/or the like; and one or more output devices 1815, which can include without limitation one or more displays (e.g., touch screens), light emitting diodes (LEDs), speakers, and/or the like.

The mobile UWB device 1800 may also include a wireless communication interface 1830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1800 to communicate with other devices as described in the embodiments above. The wireless communication interface 1830 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1832 that send and/or receive wireless signals 1834. According to some embodiments, the wireless communication antenna(s) 1832 may comprise a plurality of discrete antennas, antenna arrays, or any combination thereof. The antenna(s) 1832 may be capable of transmitting and receiving wireless signals using beams (e.g., Tx beams and Rx beams). Beam formation may be performed using digital and/or analog beam formation techniques, with respective digital and/or analog circuitry. The wireless communication interface 1830 may include such circuitry.

As illustrated, the wireless communication interface 1830 may further comprise a UWB transceiver 1835. The UWB transceiver 1835 may be operated to perform the UWB operations described herein. Further, the wireless communications interface 1830 may comprise one or more additional communication technologies with which the OOB functionalities described herein may be performed. According to some embodiments, the UWB transceiver 1835 may be one of a plurality of UWB transceivers of the mobile UWB device 1800. Further, the UWB transceiver may be used for functionality in addition to the UWB positioning functionality described herein. Although illustrated as part of the wireless communication interface 1830, the UWB transceiver 1835 may be separate from the wireless communication interface 1830 in some embodiments.

Depending on desired functionality, the wireless communication interface 1830 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1800 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1800 can further include sensor (s) 1840. Sensor(s) 1840 may comprise, without limitation, one or more inertial sensors and/or other sensors (e.g., accelerometer(s), gyroscope(s), camera(s), magnetometer (s), altimeter(s), microphone(s), proximity sensor(s), light sensor(s), barometer(s), and the like), some of which may be used to obtain position-related measurements and/or other information.

Embodiments of the mobile UWB device 1800 may also include a Global Navigation Satellite System (GNSS) receiver 1880 capable of receiving signals 1884 from one or more GNSS satellites using an antenna 1882 (which could be the same as antenna 1832). Positioning based on GNSS signal measurement can be utilized to complement and/or incorporate the techniques described herein. The GNSS receiver 1880 can extract a position of the mobile UWB device 1800, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1880 can be used with various+storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1860 of the mobile UWB device 1800 also can comprise software elements (not shown in FIG. 18), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1860 that are executable by the mobile UWB device 1800 (and/or processor(s) 1810 or DSP 1820 within mobile UWB device 1800). In some embodiments, then, such code and/or instructions can be used to configure and/or adapt a general-purpose computer (or another device) to perform one or more operations in accordance with the described methods.

FIG. 19 is a block diagram of an embodiment of a stationary UWB device 1900, which can be utilized as described herein above. For example, stationary UWB device 1900 may operate as a tag, target UWB device, responder device, or controlee, as described herein. Additionally or alternatively, stationary UWB device 1900 may operate as a UWB anchor or controller, as described herein. In some embodiments, the stationary UWB device 1900 may even operate as a CIE or UWB management server, as described herein. It should be noted that FIG. 19 is meant only to provide a generalized illustration of various components, any or all of which may be utilized as appropriate. In some embodiments, the UWB anchor 1900 may correspond to an anchor UWB having a known location, which may be used to determine the location of other UWB devices, including mobile UWB devices. According to some embodiments, the stationary UWB device 1900 may be permanently stationary or temporarily stationary.

The stationary UWB device 1900 is shown comprising hardware elements that can be electrically coupled via a bus 1905 (or may otherwise be in communication, as appropriate). The hardware elements may include a processor(s) 1910 which can include without limitation one or more general-purpose processors, one or more special-purpose processors (such as DSP chips, graphics acceleration processors, ASICs, and/or the like), and/or other processing structure or means. As shown in FIG. 19, some embodiments may have a separate DSP 1920, depending on desired functionality. Location determination and/or other determinations based on wireless communication may be provided in the processor(s) 1910 and/or wireless communication interface 1930 (discussed below), according to some embodiments. The stationary UWB device 1900 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The stationary UWB device 1900 might also include a wireless communication interface 1930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the stationary UWB device 1900 to communicate as described herein. The wireless communication interface 1930 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1932 that send and/or receive wireless signals 1934.

As illustrated, the wireless communication interface 1930 may further comprise a UWB transceiver 1935. The UWB transceiver 1935 may be operated to perform the UWB operations described herein. Further, the wireless communications interface 1930 may comprise one or more additional communication technologies with which the OOB functionalities described herein may be performed. According to some embodiments, the UWB transceiver 1935 may be one of a plurality of UWB transceivers of the mobile UWB device 1900. Further, the UWB transceiver may be used for functionality in addition to the UWB positioning functionality described herein. Although illustrated as part of the wireless communication interface 1930, the UWB transceiver 1935 may be separate from the wireless communication interface 1930 in some embodiments.

The stationary UWB device 1900 may also include a network interface 1980, which can include support of wireline communication technologies. The network interface 1980 may include a modem, network card, chipset, and/or the like. The network interface 1980 may include one or more input and/or output communication interfaces to permit data to be exchanged with a network, communication network servers, computer systems, and/or any other electronic devices described herein. In some embodiments, the stationary UWB device 1900 may be communicatively coupled with one or more servers and/or other stationary UWB devices via the network interface 1980.

In many embodiments, the stationary UWB device 1900 may further comprise a memory 1960. The memory 1960 can include, without limitation, local and/or network-accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1960 of the stationary UWB device 1900 also may comprise software elements (not shown in FIG. 19), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1960 that are executable by the stationary UWB device 1900 (and/or processor(s) 1910 or DSP 1920 within stationary UWB device 1900). In some embodiments, then, such code and/or instructions can be used to configure and/or adapt a general-purpose computer (or another device) to perform one or more operations in accordance with the described methods.

FIG. 20 is a block diagram of an embodiment of a computer system 2000, which may be used, in whole or in part, to provide the functions of a server as described in the embodiments herein (e.g., server, CIE, UWB management server, etc.). It should be noted that FIG. 20 is meant only to provide a generalized illustration of various components, any or all of which may be utilized as appropriate. FIG. 20, therefore, broadly illustrates how individual system elements may be implemented in a relatively separated or relatively more integrated manner. In addition, it can be noted that components illustrated by FIG. 20 can be localized to a single device and/or distributed among various networked devices, which may be disposed at different geographical locations.

The computer system 2000 is shown comprising hardware elements that can be electrically coupled via a bus 2005 (or may otherwise be in communication, as appropriate). The hardware elements may include processor(s) 2010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 2000 also may comprise one or more input devices 2015, which may comprise without limitation a mouse, a keyboard, a camera, a microphone, and/or the like; and one or more output devices 2020, which may comprise without limitation a display device, a printer, and/or the like.

The computer system 2000 may further include (and/or be in communication with) one or more non-transitory storage devices 2025, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 2000 may also include a communications subsystem 2030, which may (optionally, as indicated by dotted lines) comprise wireless communication technologies managed and controlled by a wireless communication interface 2033, as well as wired technologies (such as Ethernet, coaxial communications, universal serial bus (USB), and the like). The wireless communication interface 2033 may comprise one or more wireless transceivers that may send and receive wireless signals 2055 (e.g., signals according to 5G NR or LTE) via wireless antenna(s) 2050. Optionally, these one or more wireless transceivers may comprise a UWB transceiver 2034. Thus the communications subsystem 2030 may comprise a modem, a network card (wireless or wired), an infrared communication device, a wireless communication device, and/or a chipset, and/or the like, which may enable the computer system 2000 to communicate on any or all of the communication networks described herein to any device on the respective network. Hence, the communications subsystem 2030 may be used to receive and send data as described in the embodiments herein.

In many embodiments, the computer system 2000 will further comprise a working memory 2035, which may comprise a RAM or ROM device, as described above. Software elements, shown as being located within the working memory 2035, may comprise an operating system 2040, device drivers, executable libraries, and/or other code, such as one or more applications 2045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general-purpose computer (or another device) to perform one or more operations in accordance with the described methods.

A set of these instructions and/or code might be stored on a non-transitory computer-readable storage medium, such as the storage device(s) 2025 described above. In some cases, the storage medium might be incorporated within a computer system, such as computer system 2000. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 2000 and/or might take the form of source and/or installable code, which, upon compilation and/or installation on the computer system 2000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of ultra-wideband (UWB) anchor configuration by a UWB management server, the method comprising: sending a first control message from the UWB management server to a first UWB anchor device, wherein: the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning; determining a second threshold for identifying one or more UWB responder devices having respective one or more reserved time slots in the CAP; and sending a second control message from the UWB management server to the first UWB anchor device, wherein the second control message causes the first UWB anchor device to either: (i) move the respective one or more reserved time slots in the CAP for the one or more UWB responder devices to a respective one or more time slots in a Contention Free Period (CFP) of the UWB positioning session, or (ii) terminate the UWB positioning session with the one or more UWB responder devices.

Clause 2. The method of clause 1, further comprising receiving Responder Management List (RML) information indicative of a respective RML of each UWB anchor device of a plurality of UWB anchor devices comprising the first UWB anchor device, wherein the second threshold is based at least in part on the RML information.

Clause 3. The method of clause 2 further comprising sending a request for the RML information to the plurality of UWB anchor devices, wherein receiving the RML information is responsive to sending the request.

Clause 4. The method of any of clauses 1-3 wherein the first threshold is based at least in part on: a length of an RML of the first UWB anchor device, an average number of devices in the CAP, or both.

Clause 5. The method of any of clauses 1-4 wherein sending the second control message from the UWB management server to the first UWB anchor device is responsive to: receiving a message at the UWB management server from the first UWB anchor device indicating the first threshold has been exceeded, and identifying, at the UWB management server, the one or more UWB responder devices using the second threshold.

Clause 6. The method of clause 5 wherein the second control message identifies the one or more UWB responder devices to the first UWB anchor device.

Clause 7. The method of any of clauses 1-6 wherein the second control message provides the second threshold to the first UWB anchor device.

Clause 8. The method of any of clauses 1-7 further comprising receiving, at the UWB management server from the first UWB anchor device, capability information of the first UWB anchor device, and sending a configuration message to the first UWB anchor device based at least in part on the capability information of the first UWB anchor device.

Clause 9. The method of clause 8 wherein the configuration message comprises: a specified size for the CAP, a specified size for the CFP, a reserved time slot for a UWB responder device of the one or more UWB responder devices, or a Tx offset for a UWB responder device of the one or more UWB responder devices, or a combination thereof.

Clause 10. The method of any of clauses 1-9 wherein the UWB management server comprises a Connected Intelligent Edge (CIE) configured to provide each of the at least a subset of a plurality of UWB anchor devices comprising the first UWB anchor device with UWB positioning session configurations.

Clause 11. The method of any of clauses 1-10 wherein the second threshold comprises: an RML-based threshold, a mobility threshold, a traffic threshold, or a combination thereof.

Clause 12. A computer server configured to manage ultra-wideband (UWB) anchors, the computer server comprising: a transceiver; a memory; and one or more processors communicatively coupled with the transceiver and the memory, and wherein the one or more processors are configured to perform the method of any of clauses 1-11.

Clause 13. A device comprising means for performing the method of any of clauses 1-11.

Clause 14. A non-transitory computer-readable medium having instructions embedded thereon, which, when executed by one or more processors, cause the one or more processors to perform the method of any of clauses 1-11.

Clause 15. A method of ultra-wideband (UWB) anchor configuration, the method comprising: receiving, at a first UWB anchor device, a first control message from a UWB management server, wherein: the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning; receiving, at the first UWB anchor device, a second control message from the UWB management server; and responsive to receiving the second control message, either: (i) moving respective one or more reserved time slots in the CAP for one or more UWB responder devices to a respective one or more time slots in a contention free period (CFP) of the UWB positioning session, or (ii) terminating the UWB positioning session with the one or more UWB responder devices; wherein the one or more UWB responder devices are identified using a second threshold.

Clause 16. The method of clause 15, further comprising sending, from the first UWB anchor device, Responder Management List (RML) information to the UWB management server, the RML information indicative of a RML of the first UWB anchor device, wherein the second threshold is based at least in part on the RML information.

Clause 17. The method of clause 16 wherein sending the RML information is responsive to receiving, at the first UWB anchor device, a request for the RML information from the UWB management server.

Clause 18. The method of any of clauses 15-17 wherein the first threshold is based at least in part on: a length of an RML of the first UWB anchor device, an average number of devices in the CAP, or both.

Clause 19. The method of any of clauses 15-18 wherein, prior to receiving the second control message from the UWB management server, the first UWB anchor device determines the first threshold has been exceeded; and sends a message to the UWB management server indicating the first threshold has been exceeded.

Clause 20. The method of clause 19 wherein the second control message identifies the one or more UWB responder devices to the first UWB anchor device.

Clause 21. The method of any of clauses 15-20 wherein the second control message provides the second threshold to the first UWB anchor device.

Clause 22. The method of any of clauses 15-21 further comprising sending, from the first UWB anchor device to the UWB management server, capability information of the first UWB anchor device, and receiving, at the first UWB anchor device from the UWB management server, a configuration message based at least in part on the capability information of the first UWB anchor device.

Clause 23. The method of clause 22 wherein the configuration message comprises: a specified size for the CAP, a specified size for the CFP, a reserved time slot for a UWB responder device of the one or more UWB responder devices, or a Tx offset for a UWB responder device of the one or more UWB responder devices, or a combination thereof.

Clause 24. The method of any of clauses 15-23 wherein the second threshold comprises: an RML-based threshold, a mobility threshold, a traffic threshold, or a combination thereof.

Clause 25. A device comprising: a UWB transceiver; a memory; and one or more processors communicatively coupled with the UWB transceiver and the memory, and wherein the one or more processors are configured to perform the method of any of clauses 15-24.

Clause 26. A device comprising means for performing the method of any of clauses 15-24.

Clause 27. A non-transitory computer-readable medium having instructions embedded thereon, which, when executed by one or more processors, cause the one or more processors to perform the method of any of clauses 15-24.

Clause 28. A method of ultra-wideband (UWB) anchor configuration by a UWB management server, the method comprising: receiving, at the UWB management server, Responder Management List (RML) information indicative of a respective RML of each UWB anchor device of a plurality of UWB anchor devices; determining, with the UWB management server, a configuration for a plurality of concurrent UWB positioning sessions of at least one UWB anchor device of the plurality of UWB anchor devices, wherein: the configuration is based at least in part on the RML information, and the configuration includes one or more parameters for transmissions by one or more UWB responder devices during the plurality of concurrent UWB positioning sessions; and sending a control message from the UWB management server to the at least one UWB anchor device indicative of the configuration.

Clause 29. The method of clause 28, wherein the one or more parameters include a slot allocation in a UWB positioning session of the plurality of concurrent UWB positioning sessions reserved for a UWB responder device of the one or more UWB responder devices.

Clause 30. The method of clause 29 wherein the slot allocation is for a reserved time slot in a Contention Access Period (CAP) in the UWB positioning session.

Clause 31. The method of clause 29 wherein the slot allocation is for a reserved time slot in a Contention Free Period (CFP) in the UWB positioning session.

Clause 32. The method of any of clauses 28-31 wherein the one or more parameters include a Tx offset for a UWB positioning session of the plurality of concurrent UWB positioning sessions.

Clause 33. The method of any of clauses 28-32 wherein the configuration further includes an indication, to the at least one UWB anchor device, to move a reserved time slot for a UWB responder device of the one or more UWB responder devices from a CAP to a CFP.

Clause 34. A computer server configured to manage ultra-wideband (UWB) anchors, the computer server comprising: a transceiver; a memory; and one or more processors communicatively coupled with the transceiver and the memory, and wherein the one or more processors are configured to perform the method of any of clauses 28-33.

Clause 35. A device comprising means for performing the method of any of clauses 28-33.

Clause 36. A non-transitory computer-readable medium having instructions embedded thereon, which, when executed by one or more processors, cause the one or more processors to perform the method of any of clauses 28-33.

Clause 37. A method of ultra-wideband (UWB) anchor configuration, the method comprising: sending, from a first UWB anchor device to a UWB management server, Responder Management List (RML) information indicative of a RML of the first UWB anchor device; receiving, at the first UWB anchor device, a control message from the UWB management server, the control message indicative of a configuration for a UWB positioning session, wherein: the configuration is based at least in part on the RML information, and the configuration includes one or more parameters for transmissions by one or more UWB responder devices during the UWB positioning sessions; and sending a message to the one or more UWB responder devices indicative of the configuration.

Clause 38. The method of clause 37, wherein the one or more parameters include a slot allocation in the UWB positioning session reserved for a UWB responder device of the one or more UWB responder devices.

Clause 39. The method of clause 38 wherein the slot allocation is for a reserved time slot in a Contention Access Period (CAP) in the UWB positioning session.

Clause 40. The method of any clause 38 wherein the slot allocation is for a reserved time slot in a Contention Free Period (CFP) in the UWB positioning session.

Clause 41. The method of any of clauses 37-40 wherein the one or more parameters include a Tx offset for the UWB positioning session.

Clause 42. The method of any of clauses 37-41 wherein the configuration further includes an indication to move a reserved time slot for a UWB responder device of the one or more UWB responder devices from a CAP to a CFP in the UWB positioning session.

Clause 43. A device comprising: a UWB transceiver; a memory; and one or more processors communicatively coupled with the UWB transceiver and the memory, and wherein the one or more processors are configured to perform the method of any of clauses 37-42.

Clause 44. A device comprising means for performing the method of any of clauses 37-42.

Clause 45. A non-transitory computer-readable medium having instructions embedded thereon, which, when executed by one or more processors, cause the one or more processors to perform the method of any of clauses 37-42.

What is claimed is:

1. A method of ultra-wideband (UWB) anchor configuration by a UWB management server, the method comprising:

sending a first control message from the UWB management server to a first UWB anchor device, wherein:

the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning;

determining a second threshold for identifying one or more UWB responder devices having respective one or more reserved time slots in the CAP; and sending a second control message from the UWB management server to the first UWB anchor device, wherein the second control message causes the first UWB anchor device to either:

(i) move the respective one or more reserved time slots in the CAP for the one or more UWB responder devices to a respective one or more time slots in a Contention Free Period (CFP) of the UWB positioning session, or (ii) terminate the UWB positioning session with the one or more UWB responder devices.

2. The method of claim 1, further comprising receiving Responder Management List (RML) information indicative of a respective RML of each UWB anchor device of a plurality of UWB anchor devices comprising the first UWB anchor device, wherein the second threshold is based at least in part on the RML information.

3. The method of claim 2, further comprising sending a request for the RML information to the plurality of UWB anchor devices, wherein receiving the RML information is responsive to sending the request.

4. The method of claim 1, wherein the first threshold is based at least in part on:

a length of an RML of the first UWB anchor device, an average number of devices in the CAP, or both.

5. The method of claim 1, wherein sending the second control message from the UWB management server to the first UWB anchor device is responsive to:

receiving a message at the UWB management server from the first UWB anchor device indicating the first threshold has been exceeded, and identifying, at the UWB management server, the one or more UWB responder devices using the second threshold.

6. The method of claim 5, wherein the second control message identifies the one or more UWB responder devices to the first UWB anchor device.

7. The method of claim 1, wherein the second control message provides the second threshold to the first UWB anchor device.

8. The method of claim 1, further comprising:

receiving, at the UWB management server from the first UWB anchor device, capability information of the first UWB anchor device, and sending a configuration message to the first UWB anchor device based at least in part on the capability information of the first UWB anchor device.

9. The method of claim 8, wherein the configuration message comprises:

a specified size for the CAP, a specified size for the CFP, a reserved time slot for a UWB responder device of the one or more UWB responder devices, a Tx offset for a UWB responder device of the one or more UWB responder devices, or a combination thereof.

10. The method of claim 1, wherein the UWB management server comprises a Connected Intelligent Edge (CIE) configured to provide each of the at least a subset of a plurality of UWB anchor devices comprising the first UWB anchor device with UWB positioning session configurations.

11. The method of claim 1, wherein the second threshold comprises:

an RML-based threshold, a mobility threshold, a traffic threshold, or a combination thereof.

12. A method of ultra-wideband (UWB) anchor configuration, the method comprising:

receiving, at a first UWB anchor device, a first control message from a UWB management server, wherein:

the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning;

receiving, at the first UWB anchor device, a second control message from the UWB management server; and responsive to receiving the second control message, either:

(i) moving respective one or more reserved time slots in the CAP for one or more UWB responder devices to a respective one or more time slots in a contention free period (CFP) of the UWB positioning session, or (ii) terminating the UWB positioning session with the one or more UWB responder devices;

wherein the one or more UWB responder devices are identified using a second threshold.

13. The method of claim 12, further comprising sending, from the first UWB anchor device, Responder Management List (RML) information to the UWB management server, the RML information indicative of a RML of the first UWB anchor device, wherein the second threshold is based at least in part on the RML information.

14. The method of claim 13, wherein sending the RML information is responsive to receiving, at the first UWB anchor device, a request for the RML information from the UWB management server.

15. The method of claim 12, wherein the first threshold is based at least in part on:

a length of an RML of the first UWB anchor device, an average number of devices in the CAP, or both.

16. The method of claim 12, further comprising, prior to receiving the second control message from the UWB management server:

determining, at the first UWB anchor device, the first threshold has been exceeded; and sending a message from the first UWB anchor device to the UWB management server indicating the first threshold has been exceeded.

17. The method of claim 16, wherein the second control message identifies the one or more UWB responder devices to the first UWB anchor device.

18. The method of claim 12, wherein the second control message provides the second threshold to the first UWB anchor device.

19. The method of claim 12, further comprising:

sending, from the first UWB anchor device to the UWB management server, capability information of the first UWB anchor device, and receiving, at the first UWB anchor device from the UWB management server, a configuration message based at least in part on the capability information of the first UWB anchor device.

20. The method of claim 19, wherein the configuration message comprises:

a specified size for the CAP, a specified size for the CFP, a reserved time slot for a UWB responder device of the one or more UWB responder devices, a Tx offset for a UWB responder device of the one or more UWB responder devices, or a combination thereof.

21. The method of claim 12, wherein the second threshold comprises:

an RML-based threshold, a mobility threshold, a traffic threshold, or a combination thereof.

22. A method of ultra-wideband (UWB) anchor configuration by a UWB management server, the method comprising:

receiving, at the UWB management server, Responder Management List (RML) information indicative of a respective RML of each UWB anchor device of a plurality of UWB anchor devices;

determining, with the UWB management server, a configuration for a plurality of concurrent UWB positioning sessions of at least one UWB anchor device of the plurality of UWB anchor devices, wherein:

the configuration is based at least in part on the RML information, and the configuration includes one or more parameters for transmissions by one or more UWB responder devices during the plurality of concurrent UWB positioning sessions; and sending a control message from the UWB management server to the at least one UWB anchor device indicative of the configuration.

23. The method of claim 22, wherein the one or more parameters include a slot allocation in a UWB positioning session of the plurality of concurrent UWB positioning sessions reserved for a UWB responder device of the one or more UWB responder devices.

24. The method of claim 23, wherein the slot allocation is for a reserved time slot in a Contention Access Period (CAP) in the UWB positioning session.

25. The method of claim 23, wherein the slot allocation is for a reserved time slot in a Contention Free Period (CFP) in the UWB positioning session.

26. The method of claim 22, wherein the one or more parameters include a Tx offset for a UWB positioning session of the plurality of concurrent UWB positioning sessions.

27. The method of claim 22, wherein the configuration further includes an indication, to the at least one UWB anchor device, to move a reserved time slot for a UWB responder device of the one or more UWB responder devices from a CAP to a CFP.

28. A method of ultra-wideband (UWB) anchor configuration, the method comprising:

sending, from a first UWB anchor device to a UWB management server, Responder Management List (RML) information indicative of a RML of the first UWB anchor device;

receiving, at the first UWB anchor device, a control message from the UWB management server, the control message indicative of a configuration for a UWB positioning session, wherein:

the configuration is based at least in part on the RML information, and the configuration includes one or more parameters for transmissions by one or more UWB responder devices during the UWB positioning sessions; and sending a message to the one or more UWB responder devices indicative of the configuration.

29. The method of claim 28, wherein the one or more parameters include a slot allocation in the UWB positioning session reserved for a UWB responder device of the one or more UWB responder devices.

30. The method of claim 29, wherein the slot allocation is for a reserved time slot in a Contention Access Period (CAP) in the UWB positioning session.

31. The method of claim 29, wherein the slot allocation is for a reserved time slot in a Contention Free Period (CFP) in the UWB positioning session.

32. The method of claim 28, wherein the one or more parameters include a Tx offset for the UWB positioning session.

33. The method of claim 28, wherein the configuration further includes an indication to move a reserved time slot for a UWB responder device of the one or more UWB responder devices from a CAP to a CFP in the UWB positioning session.

34. A ultra-wideband (UWB) management server comprising:

a transceiver;

a memory; and one or more processors communicatively coupled with the transceiver and the memory, wherein the one or more processors are configured to:

send a first control message via the transceiver to a first UWB anchor device, wherein:

the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning;

determine a second threshold for identifying one or more UWB responder devices having respective one or more reserved time slots in the CAP; and send a second control message via the transceiver to the first UWB anchor device, wherein the second control message is configured to cause the first UWB anchor device to either:

(i) move the respective one or more reserved time slots in the CAP for the one or more UWB responder devices to a respective one or more time slots in a Contention Free Period (CFP) of the UWB positioning session, or (ii) terminate the UWB positioning session with the one or more UWB responder devices.

35. A first ultra-wideband (UWB) anchor device comprising:

a transceiver;

a memory; and one or more processors communicatively coupled with the transceiver and the memory, wherein the one or more processors are configured to:

receive, via the transceiver, a first control message from a UWB management server, wherein:

the first control message is indicative of a first threshold for the first UWB anchor device to use in a UWB positioning session, and the first threshold specifies at least one trigger condition for making available one or more reserved time slots in a Contention Access Period (CAP) of the UWB positioning session for contention-based positioning;

receive, via the transceiver, a second control message from the UWB management server; and responsive to receiving the second control message, either:

(i) moving respective one or more reserved time slots in the CAP for one or more UWB responder devices to a respective one or more time slots in a contention free period (CFP) of the UWB positioning session, or (ii) terminating the UWB positioning session with the one or more UWB responder devices;

wherein the one or more UWB responder devices are identified using a second threshold.

36. A ultra-wideband (UWB) management server comprising:

a transceiver;

a memory; and one or more processors communicatively coupled with the transceiver and the memory, wherein the one or more processors are configured to:

receive, via the transceiver, Responder Management List (RML) information indicative of a respective RML of each UWB anchor device of a plurality of UWB anchor devices;

determine a configuration for a plurality of concurrent UWB positioning sessions of at least one UWB anchor device of the plurality of UWB anchor devices, wherein:

the configuration is based at least in part on the RML information, and the configuration includes one or more parameters for transmissions by one or more UWB responder devices during the plurality of concurrent UWB positioning sessions; and send a control message indicative of the configuration via the transceiver to the at least one UWB anchor device.

37. A first ultra-wideband (UWB) anchor device comprising:

a transceiver;

a memory; and one or more processors communicatively coupled with the transceiver and the memory, wherein the one or more processors are configured to:

send, via the transceiver to a UWB management server, Responder Management List (RML) information indicative of a RML of the first UWB anchor device;

receive, via the transceiver, a control message from the UWB management server, the control message indicative of a configuration for a UWB positioning session, wherein:

the configuration is based at least in part on the RML information, and the configuration includes one or more parameters for transmissions by one or more UWB responder devices during the UWB positioning sessions; and send a message indicative of the configuration to the one or more UWB responder devices.

* * * * *